(12) United States Patent
Kanamori et al.

(10) Patent No.: US 8,718,148 B2
(45) Date of Patent: May 6, 2014

(54) INFORMATION PROCESSING APPARATUS, INFORMATION PROCESSING METHOD, AND PROGRAM

(75) Inventors: Naohiro Kanamori, Kanagawa (JP); Norio Wakatsuki, Kanagawa (JP); Mamoru Ueda, Kanagawa (JP); Shinpei Ikegami, Kanagawa (JP)

(73) Assignee: Sony Corporation, Tokyo (JP)

( * ) Notice: Subject to any disclaimer, the term of this patent is extended or adjusted under 35 U.S.C. 154(b) by 486 days.

(21) Appl. No.: 13/040,744

(22) Filed: Mar. 4, 2011

(65) Prior Publication Data

US 2011/0222606 A1 Sep. 15, 2011

(30) Foreign Application Priority Data

Mar. 11, 2010 (JP) ................. P2010-054374
Jan. 27, 2011 (JP) ................. P2011-014936
Jan. 27, 2011 (JP) ................. P2011-014937

(51) Int. Cl.
 *H04N 7/12* (2006.01)
(52) U.S. Cl.
 USPC .................................. 375/240.23

(58) Field of Classification Search
 USPC ...................................... 375/240.23
 See application file for complete search history.

(56) References Cited

U.S. PATENT DOCUMENTS

| | | | |
|---|---|---|---|
| 6,229,849 B1 * | 5/2001 | Mihara | 375/240.05 |
| 2003/0067989 A1 * | 4/2003 | Yoshinari | 375/240.25 |
| 2003/0154687 A1 * | 8/2003 | Sugahara et al. | 52/750 |
| 2004/0264923 A1 | 12/2004 | Ido et al. | |
| 2006/0153538 A1 * | 7/2006 | Himeno et al. | 386/111 |

* cited by examiner

*Primary Examiner* — Dave Czekaj
*Assistant Examiner* — Tracy Li
(74) *Attorney, Agent, or Firm* — Frommer Lawrence & Haug LLP; William S. Frommer

(57) ABSTRACT

Disclosed herein is an information processing apparatus including: a computation block configured, so as to make an error of a VBV occupation amount of a VBV occupation amount target picture next to base data that is variable-length encoded data to be replaced by replacing data greater than an actual value, to compute the VBV occupation amount of the VBV occupation amount target picture from a VBV delay of the VBV occupation amount target picture; and an encoding block configured to variable-length encode the replacing data on the basis of the VBV occupation amount of the VBV occupation amount target picture computed by the computation block.

12 Claims, 26 Drawing Sheets

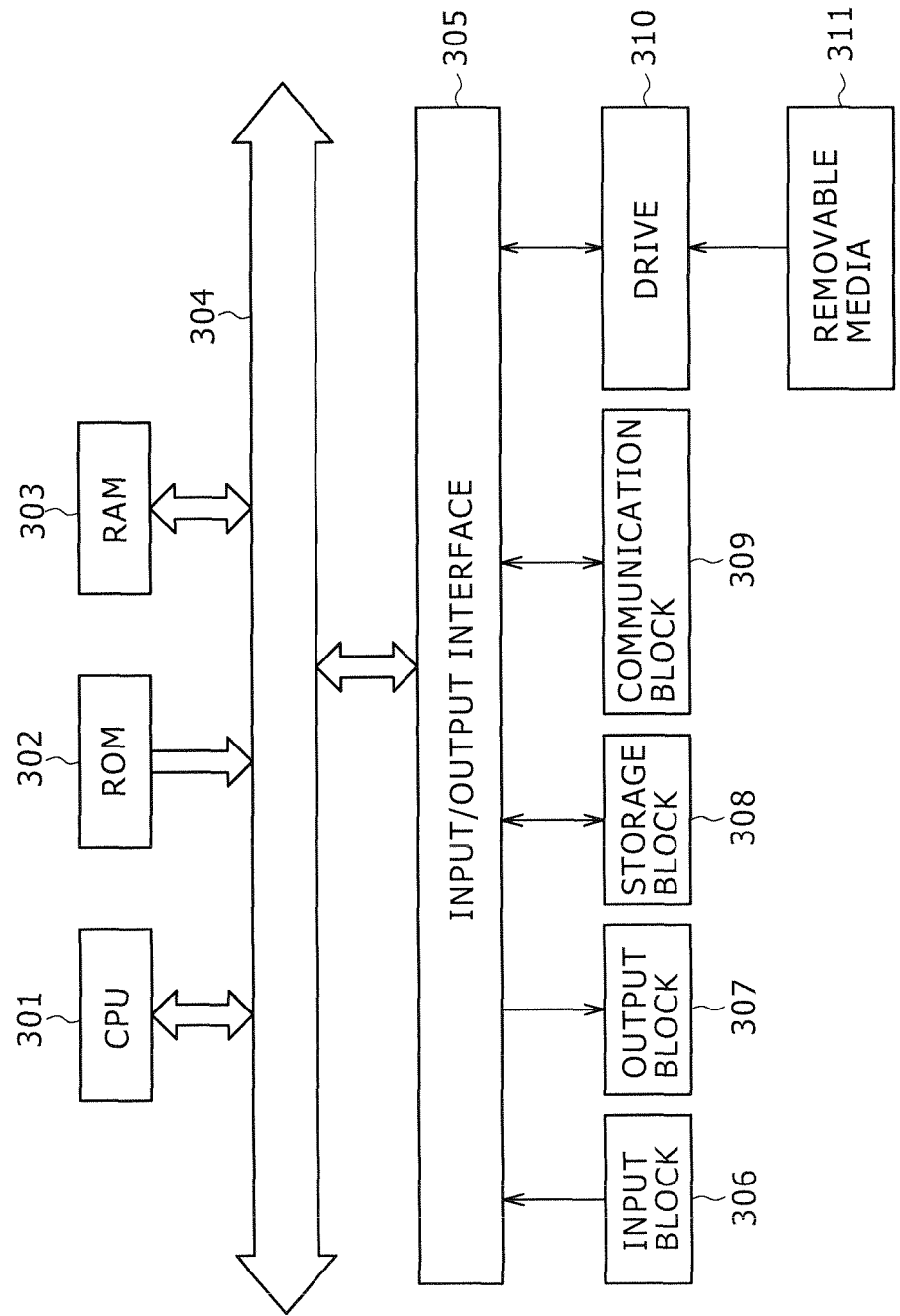

INFORMATION PROCESSING APPARATUS, INFORMATION PROCESSING METHOD, AND PROGRAM

BACKGROUND OF THE INVENTION

1. Field of the Invention

The present invention relates to an information processing apparatus, an information processing method, and a program and, more particularly, to an information processing apparatus, an information processing method, and a program that are configured to make the insert edition of variable-length encoded data be successful without fail.

2. Description of the Related Art

With related-art VTRs (Video Tape Recorders), an insert editing technique for inserting edit data into a predetermined range of the data already recorded on a video tape (this data will be hereafter referred to as base data) is frequently used in general (see PCT Patent Publication No. WO99/22374).

An insert editing function similar to related-art technologies is also required by an editing system for editing base data variable-length encoded by an MPEG (Moving Picture Experts Group phase) algorithm having a long GOP (Group Of Picture) structure (hereafter referred to as a long-GOP-structured MPEG algorithm) recorded on a recording media.

In order to replace a part of an MPEG2 (Moving Picture Experts Group phase 2) stream and establish the replaced stream also as an MPEG2 stream, it is required for a total code amount of replacing data to be lower a total code amount of the base data to be replaced. In addition, it is required to connect a VBV occupation amount at a stream connection point.

When base data and replacing data match each other in frame rate, bit rate, and VBV occupation amount at stream connection point, a total generated code amount in a re-encode range of the base data comes to match with a total generated code amount of the replacing data.

Referring to FIG. 1, there is shown a graph indicative of temporal changes of VBV occupation amounts before and after the editing when a stream can be established also after the editing.

It should be noted that, in FIG. 1, the horizontal axis is representative of time while the vertical axis is representative of a bit occupation amount in a VBV (Video Buffering Verifier) buffer that is a virtual buffer corresponding to an input buffer of a decoder (hereafter referred to as a VBV occupation amount). This holds true with FIG. 2 through FIG. 6, FIG. 10, FIG. 11, FIG. 18 through FIG. 20, and FIG. 25.

In addition, in FIG. 1, dashed lines are indicative of temporal changes of the VBV occupation amount of base data while solid lines are indicative of temporal changes of the VBV occupation amount of replacing data (or overwrite data). Therefore, the slant of each oblique dashed line and each oblique solid line is indicative of a bit rate of each frame (or picture) while the length of each vertical dashed line and each vertical solid line is indicative of a generated code amount of each frame. This holds true with FIG. 2, FIG. 6, FIG. 10, and FIG. 11.

Meanwhile, with an MPEG stream, the bit rate is stored in a sequence layer, a value of the bit rate being rounded off to 400. Hence, it can be hardly said that the bit rate obtained from the sequence layer has a bit precision. Further, the bit rate obtained from the sequence layer is nothing but one that specifies the maximum bit rate of each MPEG2 stream.

Besides, the bit rate of each frame is defined by equation (1) below:

$$R(n) = \frac{d(n)}{(\tau(n) - \tau(n+1) + t(n+1) - t(n))} \quad (1)$$

It should be noted that, in equation (1) above, R(n) is representative of a bit rate of frame n and d(n) is representative of a code amount of frame n. τ(n) is representative of VBV delay of frame n that is a time from the input of a picture start code into the VBV buffer to the start of decoding. t(n) is representative of a time at which the picture of frame n is removed from the VBV buffer.

However, equation (1) above uses the VBV delay that is a value obtained by rounding off a VBV occupation amount. In addition, equation (1) above generates a rounding error caused by division. Thus, equation (1) above has a factor of causing an error.

With systems of which bit rates are specified by guidelines or the like, the bit rates computed on the basis of equation (1) above are often outside specification values.

For these reasons, the bit rate of the base data to be replaced becomes smaller than the bit rate of replacing data and therefore the code amount of the replacing data exceeds the code amount of the base data to be replaced as shown in FIG. 2, thereby making the editing fail. It should be noted that, in FIG. 2, each thick line is indicative of an excess part of the code amount of replacing data.

So, a method is considered in which the ratio of successful editing is achieved by variable-length encoding the replacing data with a bit rate low enough than base data. However, this method obviously leads to a deteriorated picture quality. In addition, because the correct bit rate of base data is not clear until the editing processing is started, this method is not considered to be effective.

Another method is also considered in which variable-length encoding is executed by completely matching the code amount distribution of replacing data with that of base data. However, this method causes the code amount distribution of replacing data to be influenced by that of base data, resulting in picture quality deviations. In addition, the complete match in code amount distribution between replacing data and base data requires the use of a part of code amount for stuffing data, also resulting in picture quality deterioration.

On the other hand, in order to replace a part of an MPEG2 stream and establish the replaced MPEG2 stream as it is after the replacement, the continuity of VBV occupation amount must be maintained.

However, the VBV occupation amount immediately before each picture is removed from the VBV buffer is quantized to be stored as a VBV delay, so that the VBV occupation amount has an error. It should be noted that the VBV occupation amount is defined by equation (2) below.

$$0(n) = R(n) \cdot \tau(n)/90000 + \text{header}(n) \quad (2)$$

In equation (2) above, 0(n) is indicative of a VBV occupation amount of frame n and R(n) is indicative of a bit rate of frame n. τ(n) is indicative of a VBV delay of frame n and header(n) is indicative of the number of bits up to a picture start code of frame n. FIG. 3 shows a relationship of equation (2).

As described above, because a VBV occupation amount has an error, even executing variable-length encoding so as to comply with the VBV buffer restrictions at the time of editing may actually cause an overflow or underflow of the VBV buffer by the error.

Referring to FIG. 4 and FIG. 5, there are shown examples of VBV buffer failures due to an error in VBV occupation amount (hereafter referred to as an occupation amount error).

It should be noted that solid lines are indicative of the temporal changes of the VBV occupation amount of replacing data with the occupation amount error being 0 and the thick lines are indicative of the temporal changes of the VBV occupation amount of replacing data with the occupation amount error being a maximum.

As shown in FIG. 4, if encoding is executed so as for the VBV occupation amount of replacing data to comply with the restrictions of the VBV buffer, then no overflow occurs if the occupation amount error is 0; however, an overflow may occur if an upward occupation amount error occurs in the start picture in a re-encoding range. Likewise, as shown in FIG. 5, an underflow may occur if a downward occupation amount error occurs in the start picture in the re-encoding range.

With reference to FIG. 4 and FIG. 5, the influence of the occupation amount error of the start picture in the re-encoding range of base data was described. In the case of an occupation amount error of a picture (hereafter referred to as a VBV occupation amount target picture) next to the last picture in the re-encoding range of base data, the influence of this occupation amount error may also cause an underflow or an overflow.

Further, in the inserting editing of an MPEG stream recording on a recording media, replacing data must be stored in the recording area of base data without failure. If the correct bit rate of base data and the VBV occupation amount having bit precision are known, then connecting the VBV occupation amount at a stream point matches the total code amount of the base data to be replaced with the total code amount of the replacing data.

However, in the case where the VBV occupation amount converted from the VBV delay is used for the VBV occupation amount of base data, an error occurs in the code amounts before and after the editing by an occupation amount error difference between the start picture of the re-encoding range and the VBV occupation amount target picture as shown in FIG. 6. Consequently, the total code amount of replacing data exceeds the total code amount of the base data to be replaced, thereby disabling the storage of the replacing data into recording area of this base data.

SUMMARY OF THE INVENTION

As described above, because the VBV occupation amount obtained from a VBV delay has an error, it is difficult to make insert editing be successful without failure.

Therefore, the present invention addresses the above-identified and other problems associated with related-art methods and apparatuses and solves the addressed problems by providing an information processing apparatus, an information processing method, and a program that are configured to provide successful insert editing of variable-length encoded data without failure.

In carrying out the invention and according to one aspect thereof, there is provided an information processing apparatus. This information processing apparatus has a computation block configured, so as to make an error of a VBV (Video Buffering Verifier) occupation amount of a VBV occupation amount target picture next to base data that is variable-length encoded data to be replaced by replacing data greater than an actual value, to compute the VBV occupation amount of the VBV occupation amount target picture from a VBV delay of the VBV occupation amount target picture; and an encoding block configured to variable-length encode the replacing data on the basis of the VBV occupation amount of the VBV occupation amount target picture computed by the computation block.

An information processing method and an information processing program practiced as one aspect of the present technology correspond to the information processing apparatus of the third aspect of the present technology.

In the embodiment of the present technology, so as to make an error of a VBV (Video Buffering Verifier) occupation amount of a VBV occupation amount target picture next to base data that is variable-length encoded data to be replaced by replacing data greater than an actual value, the VBV occupation amount of the VBV occupation amount target picture is computed from a VBV delay of the VBV occupation amount target picture; and the replacing data is variable-length encoded on the basis of the computed VBV occupation amount of the VBV occupation amount target picture.

As described and according to an embodiment of the present technology, insert editing for inserting variable-length encoded data can be successfully executed without failure.

BRIEF DESCRIPTION OF THE DRAWINGS

Other features and advantages of the invention will become apparent from the following description of embodiments with reference to the accompanying drawings in which:

FIG. 34 is a block diagram illustrating an exemplary configuration of hardware of a computer.

DETAILED DESCRIPTION OF THE PREFERRED EMBODIMENTS

This invention will be described in further detail by way of embodiments thereof with reference to the accompanying drawings.

(1) First Embodiment

Exemplary Configuration of an Editing System Practiced as the First Embodiment

Figure 1:
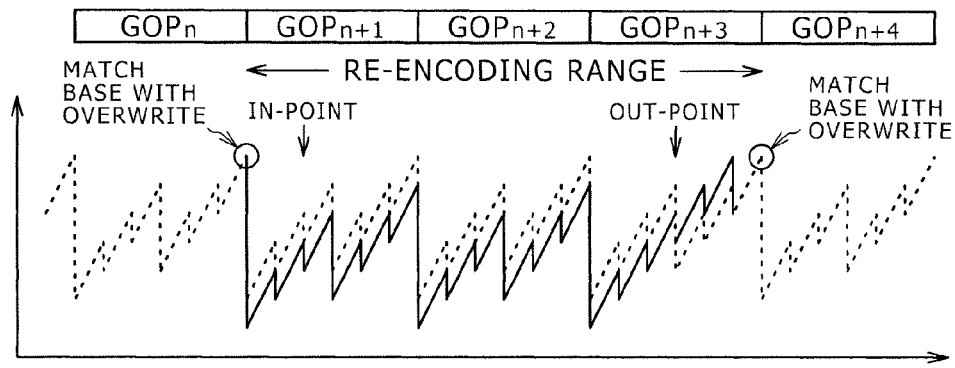
FIG. 1 is a diagram illustrating an example of temporal changes of VBV occupation amounts before and after the editing in the case where a stream is established also after editing.
Figure 2:
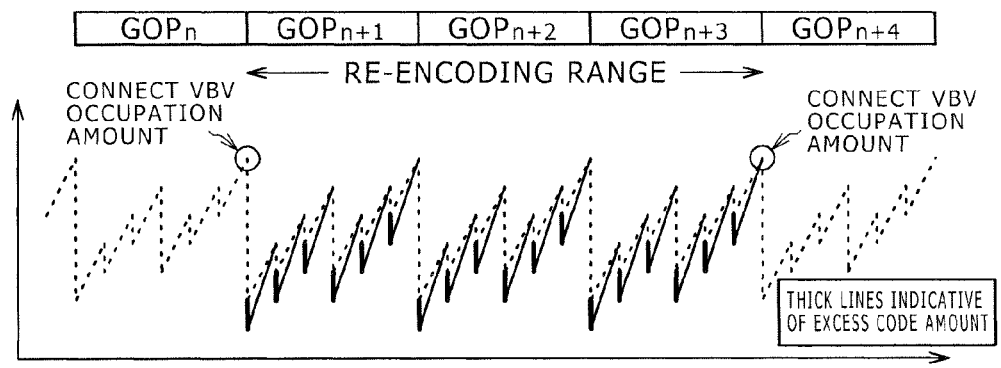
FIG. 2 is a diagram illustrating bit rates before and after editing in the case where editing fails.
Figure 3:
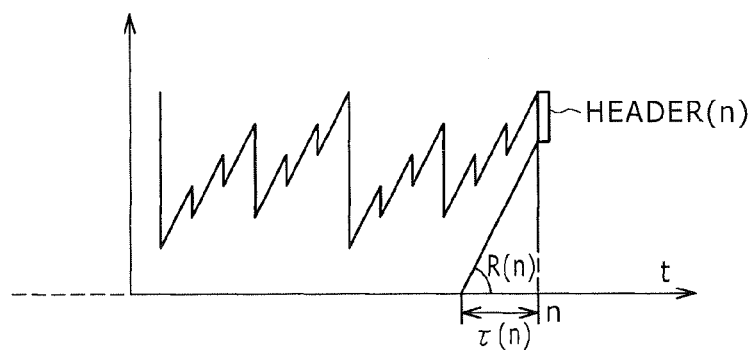
FIG. 3 is a diagram illustrating a relationship of equation (2)
Figure 4:
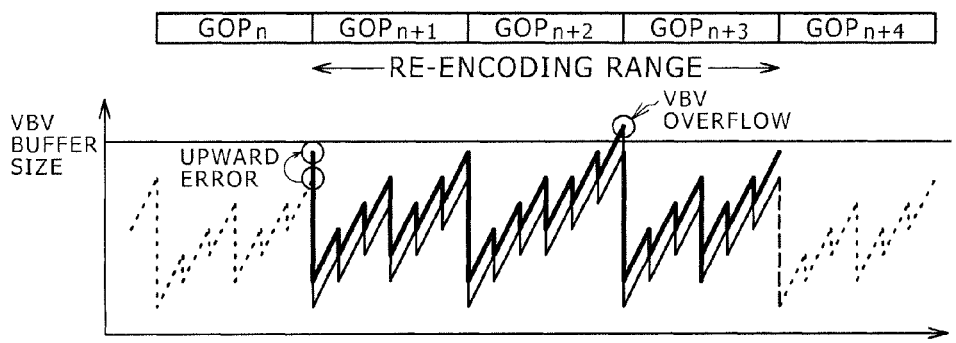
FIG. 4 is a diagram illustrating an example of a VBV buffer failure due to an occupation amount error.
Figure 5:
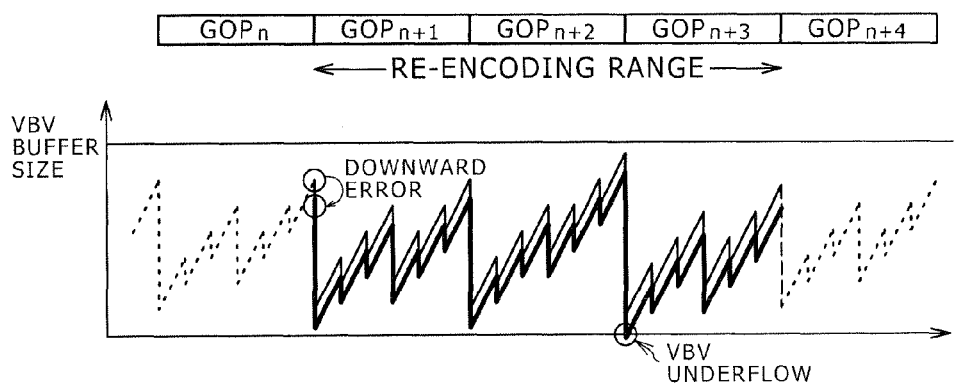
FIG. 5 is a diagram illustrating another example of a VBV buffer failure due to an occupation amount error.
Figure 6:
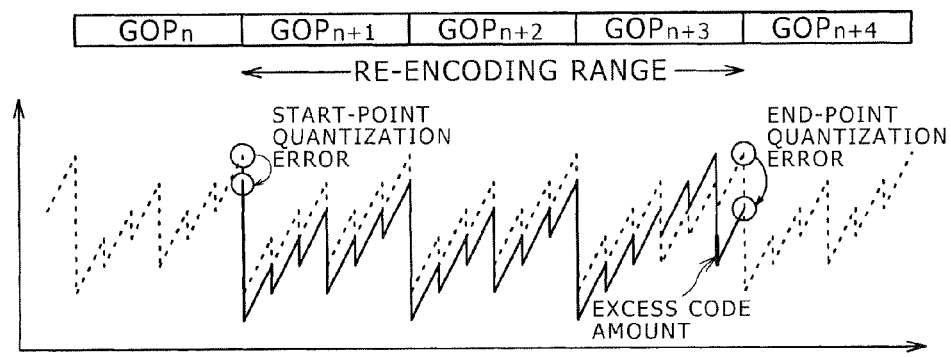
FIG. 6 is a diagram for explaining an excess code amount due to an occupation amount error.
Figure 7:
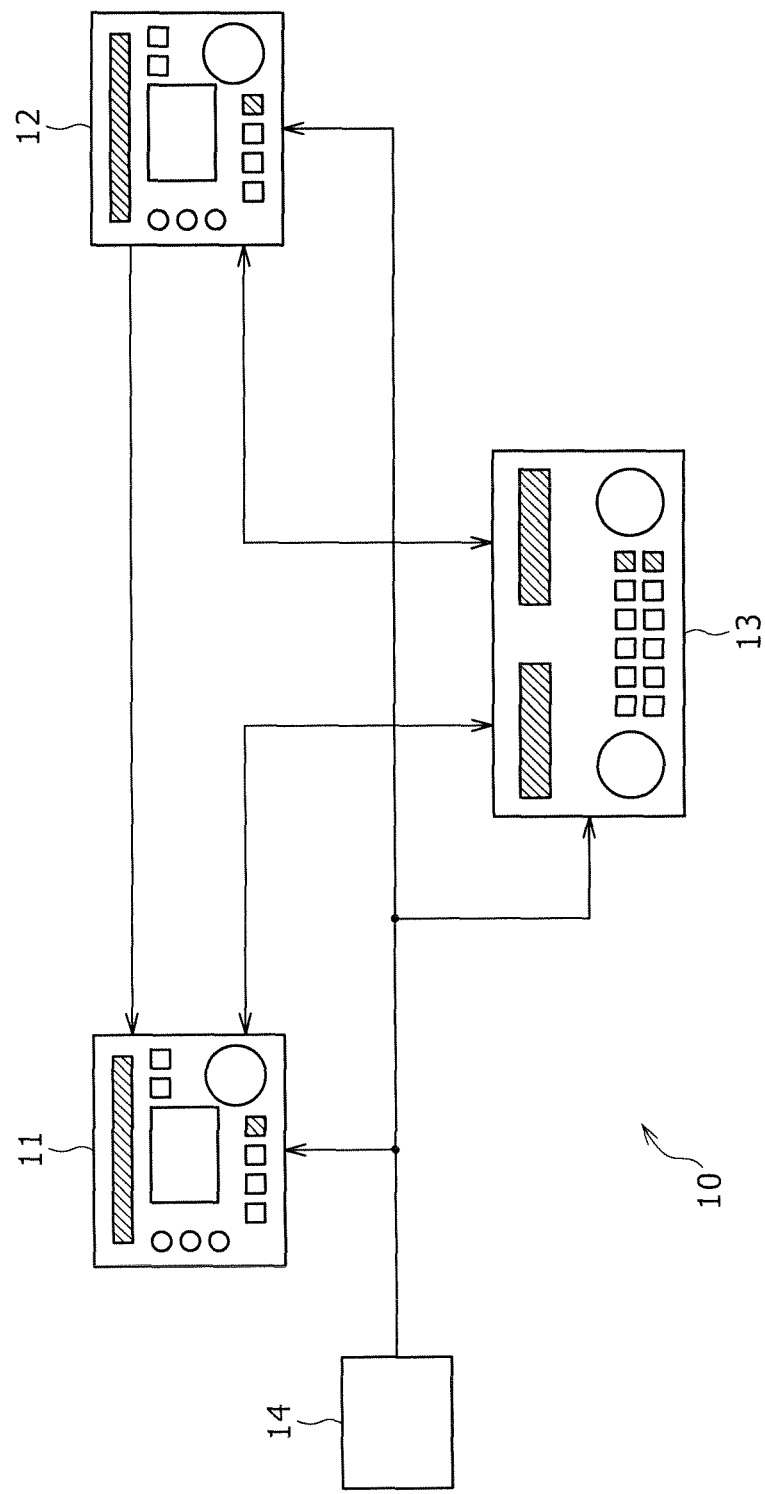
FIG. 7 is a block diagram illustrating an exemplary configuration of an editing system practiced as a first embodiment of the invention.

Now, referring to FIG. 7, there is shown a block diagram illustrating an exemplary configuration of an editing system practiced as the first embodiment of the invention.

An editing system 10 is made up of a recording machine 11, a reproducing machine 12, an editing machine 13, and a reference signal generator 14.

The recording machine 11 (or the information processing apparatus) is connected to the reproducing machine 12 by a coaxial cable. The recording machine 11 variable-length encodes base data, such as video data, in the long-GOP-structured MPEG algorithm and records the encoded base data to a recording media loaded on the recording machine 11. In addition, the recording machine 11 is connected to the editing machine 13 by a control line. This control line is a 9-pin cable of the RS-422 standard for example. The recording machine 11 transmits various signals to the editing machine 13 over the control line.

In accordance with control signals transmitted from the editing machine 13 over the control line, the recording machine 11 inserts edit data transmitted from the reproducing machine 12 as an HD-SDI (High Definition Serial Digital Interface) signal into an edit range of base data recorded to the recording media. It should be noted that, at the time of insertion, the recording machine 11 computes the bit rate of the base data on a GOP basis as a local bit rate (hereafter referred to as a local bit rate) and variable-length encodes the replacing data including the edit data on the basis of the local bit rate.

The reproducing machine 12 is connected to the editing machine 13 by the control line like the recording machine 11. In accordance with control signals transmitted from the editing machine 13 over the control line, the reproducing machine 12 reads the data from a recording media loaded on the reproducing machine 12 as edit data and supplies the edit data to the recording machine 11 as an HD-SDI signal. In addition, the reproducing machine 12 transmits various signals to the editing machine 13 over the control line.

The editing machine 13 is configured by a remote controller for example. The editing machine 13 transmits a control signal corresponding to a user instruction to the recording machine 11 and the reproducing machine 12 over the control line to control the recording machine 11 and the reproducing machine 12, thereby executing insert editing. To be more specific, the editing machine 13 controls the recording machine 11 and the reproducing machine 12 to write the edit data reproduced by the reproducing machine 12 over the edit range of the base data recorded to the recording media of the recording machine 11.

The reference signal generator 14 generates reference signals that provide references for the timings of control, recording, and reproduction on the recording machine 11, the reproducing machine 12, and the editing machine 13 and supplies the generated reference signals to the recording machine 11, the reproducing machine 12, and the editing machine 13.

[Detail Exemplary Configuration of the Recording Machine]

Figure 8:
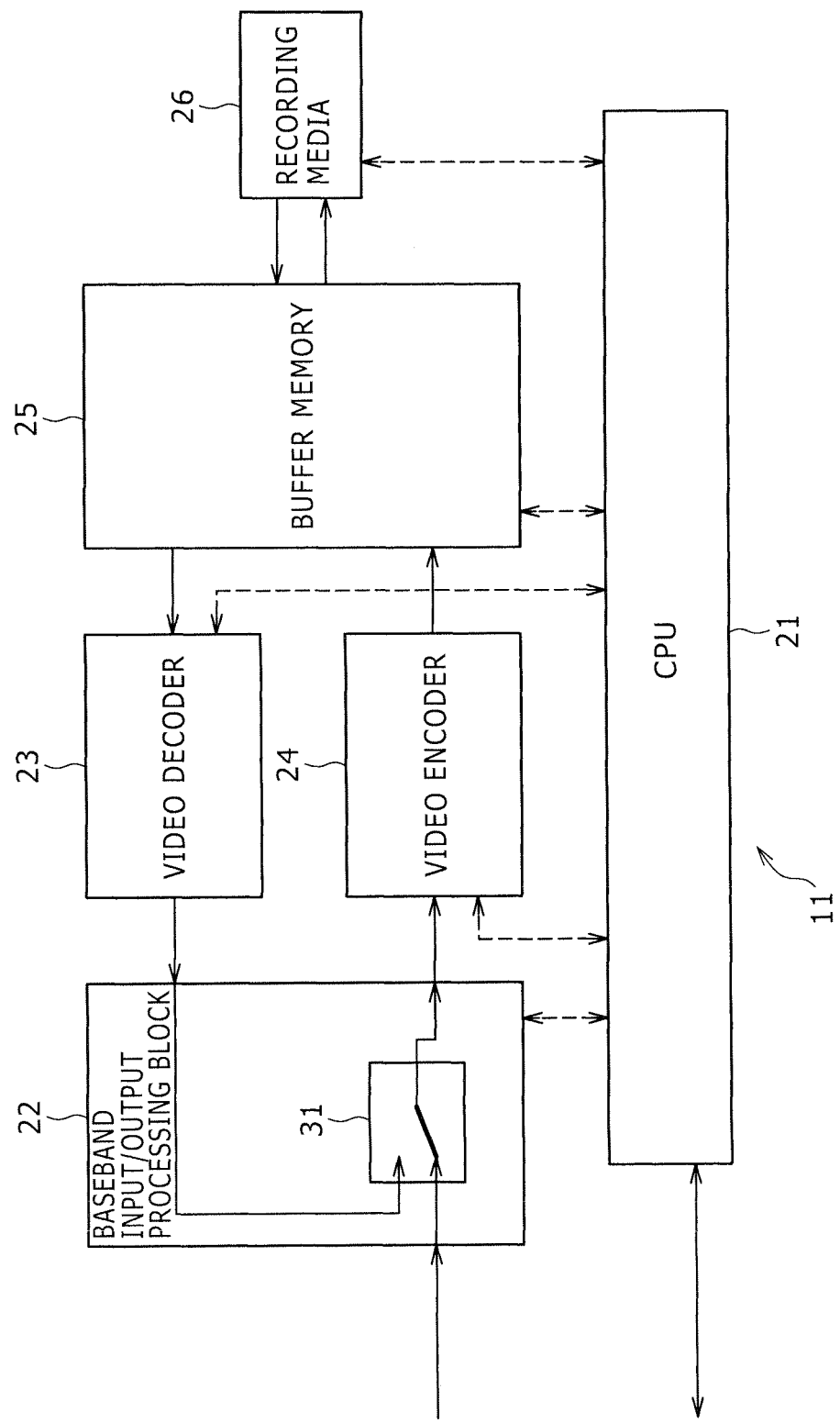
FIG. 8 is a block diagram illustrating an exemplary detail configuration of a recording machine shown in FIG. 7.

Referring to FIG. 8, there is shown a block diagram illustrating an exemplary detail configuration of the recording machine 11 shown in FIG. 7.

As shown in FIG. 8, the recording machine 11 is made up of a CPU (Central Processing Unit) 21, a baseband input/output processing block 22, a video decoder 23, a video encoder 24, a buffer memory 25, and a recording media 26.

The CPU 21 controls other component blocks in units of frame or GOP on the basis of control signals and so on supplied from the editing machine 13.

For example, on the basis of a control signal indicative of a user-specified in-point supplied from the editing machine 13, the CPU 21 controls the recording media 26 to start reading pictures subsequent to a start picture of the GOP including the in-point from the recording media 26. At the same time, on the basis of a control signal indicative of a user-specified out-point supplied from the editing machine 13, the CPU 21 controls the recording media 26 to stop the reading at the end of the reading of a terminal picture of the GOP including the out-point from the recording media 26.

Also, the CPU 21 monitors other component blocks. The CPU 21 transmits a signal indicative of the information on the recording machine 11, such as a time code, to the editing machine 13.

The baseband input/output processing block 22 has a selector 31. The baseband input/output processing block 22 obtains edit data or base data transmitted from the reproducing machine 12 as an HD-SDI signal and supplies the obtained data to the selector 31. It should be noted that this base data may be obtained from a device, not shown, other than the reproducing machine 12 or recorded in a memory, not shown, of the recording machine 11.

In addition, the baseband input/output processing block 22 supplies the a decoding result of the base data supplied from the video decoder 23 or recorded to the recording media 26 to the selector 31.

The selector 31 supplies the decoded base data transmitted from the reproducing machine 12 to the video encoder 24. At the same time, under the control of the CPU 21, the selector 31 selects one of the base data and the edit data supplied from the video decoder 23 and supplies the selected base data or edit data to the video encoder 24 as replacing data.

To be more specific, if an in-point or out-point is located halfway in a GOP, it is necessary to variable-length encode the base data from the beginning of the GOP to the in-point and the base data from the out-point to the terminal again and use the base data as a reference picture at the time of variable-length encoding. Therefore, in such a case, the selector 31 selects the base data from the beginning of the GOP to the in-point and the base data from the out-point to the terminal and supplies the selected base data to the video encoder 24 as replacing data.

The video decoder 23 reads the base data that is variable-length encoded by an long-GOP-structured MPEG algorithm from the buffer memory 25 and decodes the read base data. The video decoder 23 supplies a decoding result of the base data to the baseband input/output processing block 22.

The video encoder 24 variable-length encodes the replacing data or the base data supplied from the selector 31 in the long-GOP-structured MPEG algorithm. At the same time, the video encoder 24 supplies the variable-length encoded replacing data or base data to the buffer memory 25 as recording data.

The buffer memory 25 temporarily stores the recording data supplied from the video encoder 24. At the same time, the buffer memory 25 reads the recording data and supplies the read recording data to the recording media 26. Further, the buffer memory 25 temporarily stores the base data supplied from the recording media 26.

The recording media 26 is made up of a removable media based on an optical disk or a flash memory or a mass-storage recording media based on a HDD (Hard Disk Drive), for example. Under the control of the CPU 21, the recording media 26 records the recording data read from the buffer memory 25 to the recording media 26. To be more specific, the recording media 26 (or the recording block) writes the replacing data read from the buffer memory 25 in the recording area in which the base data to be replaced is recorded, for example.

In addition, under the control of the CPU 21, the recording media 26 reads the recorded base data variable-length encoded by the long-GOP-structured MPEG algorithm and supplies the read base data to the buffer memory 25.

Figure 9:
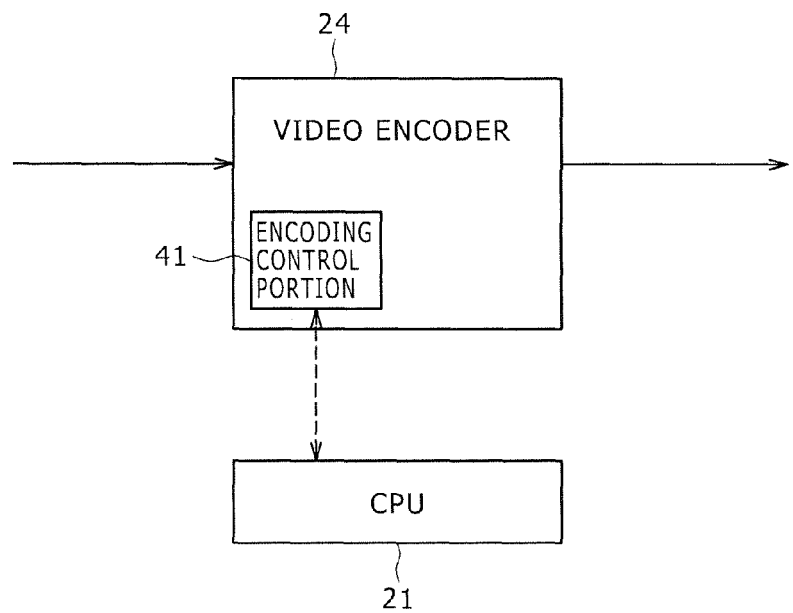
FIG. 9 is a block diagram illustrating details of processing by a CPU and a video encoder.

Referring to FIG. 9, there is shown a diagram illustrating details of the processing to be executed by the CPU 21 and the video encoder 24 in variable-length encoding replacing data.

As shown in FIG. 9, the CPU 21 computes a local bit rate on a GOP basis by use of the code amount and VBV delay and the like of the base data, for example, and supplies the computed local bit rate to the video encoder 24. At the same time, the CPU 21 computes a difference in the code amount and a difference in the VBV occupation amount between the base data and the replacing data on the basis of the code amount and VBV occupation amount of the variable-length encoded replacing data supplied from the encoding control portion 41 and the code amount and VBV occupation amount of the base data. Then, the CPU 21 computes an code amount error by use of the differences of the code amount and the VBV occupation amount and, on the basis of an obtained code amount error, computes the local bit rate of the base data subsequent to the GOP corresponding to this code amount error. Namely, the CPU 21 feeds back the code amount error to the computation of the local bit rate.

The video encoder 24 has an encoding control portion 41 for controlling the variable-length encoding of replacing data supplied from the selector 31 (refer to FIG. 8). The encoding control portion 41 executes encoding control that is finer than the control by the CPU 21 executed on frame or GOP basis. To be more specific, the encoding control portion 41 controls the variable-length encoding by the video encoder 24 on the basis of a local bit rate supplied from the CPU 21, for example. At the same time, the encoding control portion 41 obtains the code amount and VBV occupation amount of the variable-length encoded replacing data and supplies the obtained code amount and VBV occupation amount to the CPU 21.

It should be noted that, in the present embodiment, a local bit rate is obtained on a GOP basis; however, it is also applicable to obtain a local bit rate on a frame basis for example.

[Description of the Processing by the CPU]

Figure 10:
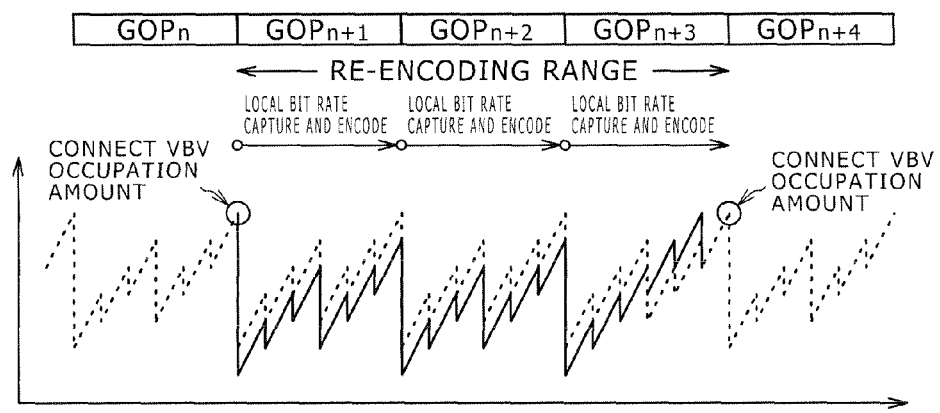
FIG. 10 is a diagram illustrating the processing by the CPU.
Figure 11:
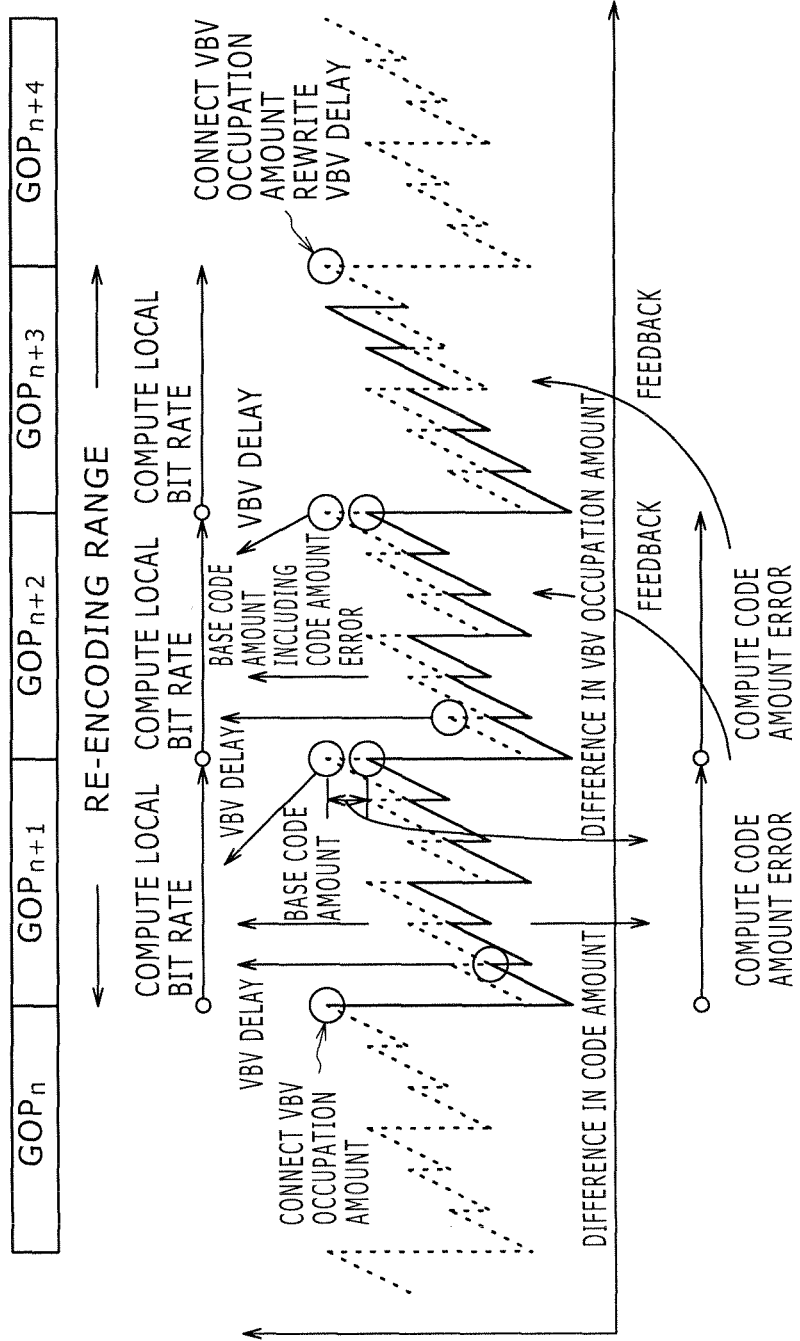
FIG. 11 is another diagram illustrating the processing by the CPU.

FIG. 10 and FIG. 11 illustrate the processing to be executed by the CPU 21.

As shown in FIG. 10, the CPU 21 computes a local bit rate on a GOP basis. To be more specific, the CPU 21 computes a local bit rate by equation (3) below by use of the code amount and VBV delay of the base data for the start GOP in the re-encode range as shown in FIG. 11.

$$R(n) = R(n+1) = \ldots = R(n+X) = \frac{d(n)}{(\tau(n)+1) - \tau(n+X) + t(n+X) - t(n))} \quad (3)$$

It should be noted that R(n) in equation (3) above is indicative of a bit rate of frame n and d(n) is indicative of a code amount of frame n; $\tau$(n) is indicative of a VBV delay of frame n; t(n) is indicative of a time at which a picture of frame n is removed from the VBV buffer; and X is indicative of the number of frames for use in the computation of a local bit rate.

According to equation (3) above, 1 is added to the VBV delay in the computation range of local bit rates. This makes it equal to that a VBV occupation amount has been rounded up when quantized to VBV delay. Therefore, according to equation (3) above, the local bit rate is computed smaller. Namely, an error of the local bit rate becomes an error in the direction in which the error gets smaller than an actual value. As a result, when a VBV occupation amount is connected, the code amount of replacing data gets smaller than the code amount of base data. Consequently, the replacing data can be surely stored in the recording area of the base data to be replaced.

In addition, the CPU 21 computes code amount errors of base data and replacing data by use of equation (4) below.

$$\text{diff}(n)^-=\{(d(n)-d^-(n)\}+(0^-(n)-0(n)| \quad (4)$$

It should be noted that, in equation (4) above, diff(n) is indicative of a code amount error of frame n; d(n) and d'(n) are indicative of a code amount of base data and a code amount of replacing data, respectively, of frame n; and 0'(n) and 0(n) are indicative of a VBV occupation amount of base data and a VBV occupation amount of replacing data, respectively, of frame n. Therefore, d(n)–d'(n) is indicative of a difference between the code amounts of base data and replacing data and 0'(n)–0(n) is indicative of a difference between the VBV occupation amounts of base data and replacing data.

If a sum of the code amount errors of the frames within a re-encode range is equal to or higher than 0, the replacing data can be stored in the recording area of the base data to be replaced while maintaining the continuity of VBV occupation amounts.

Therefore, the local bit rate is computed smaller so as to make the code amount error equal to or higher than 0 in each GOP, so that, as the variable-length encoding of the replacing data progresses, the code amount errors are accumulated. So, in order to make the most of the code amount unnecessary for maintaining the continuity of the VBV occupation amounts among the accumulated code amount errors, the CPU 21 feeds back the code amount error to the computation of a local bit rate for the GOPs other than the start GOP in each re-encode range as shown in equation (5) below.

$$R(n) = \qquad (5)$$
$$R(n+1) = \ldots = R(n+X) = \frac{d(n) + coef \sum diff(n-Y)}{((\tau(n)+1) - \tau(n+X) + t(n+X) - t(n))}$$

It should be noted that, in equation (5), R(n) is indicative of a bit rate of frame n; d(n) is indicative of a code amount of frame n; τ(n) is indicative of a VBV delay of frame n; t(n) is indicative of a time at which a picture of frame n is removed from the VBV buffer; X is indicative of the number of frames for use in computing a local bit rate; diff(n) is indicative of a code amount error of frame n; Σdiff(n–Y) is indicative of a sum of code amount errors from frame Y (1≤Y) to frame n; and coef is indicative of a feedback coefficient.

The feedback executed as described above may cause a code amount error to go negative. Therefore, feedback coefficient coef must be determined in a range such that a sum of code amount errors will not go negative. It is also practicable to fix feedback coefficient coef or adaptively change feedback coefficient coef in accordance with the length of GOP for example.

[Description of the Processing by the Recording Machine]

Figure 12:
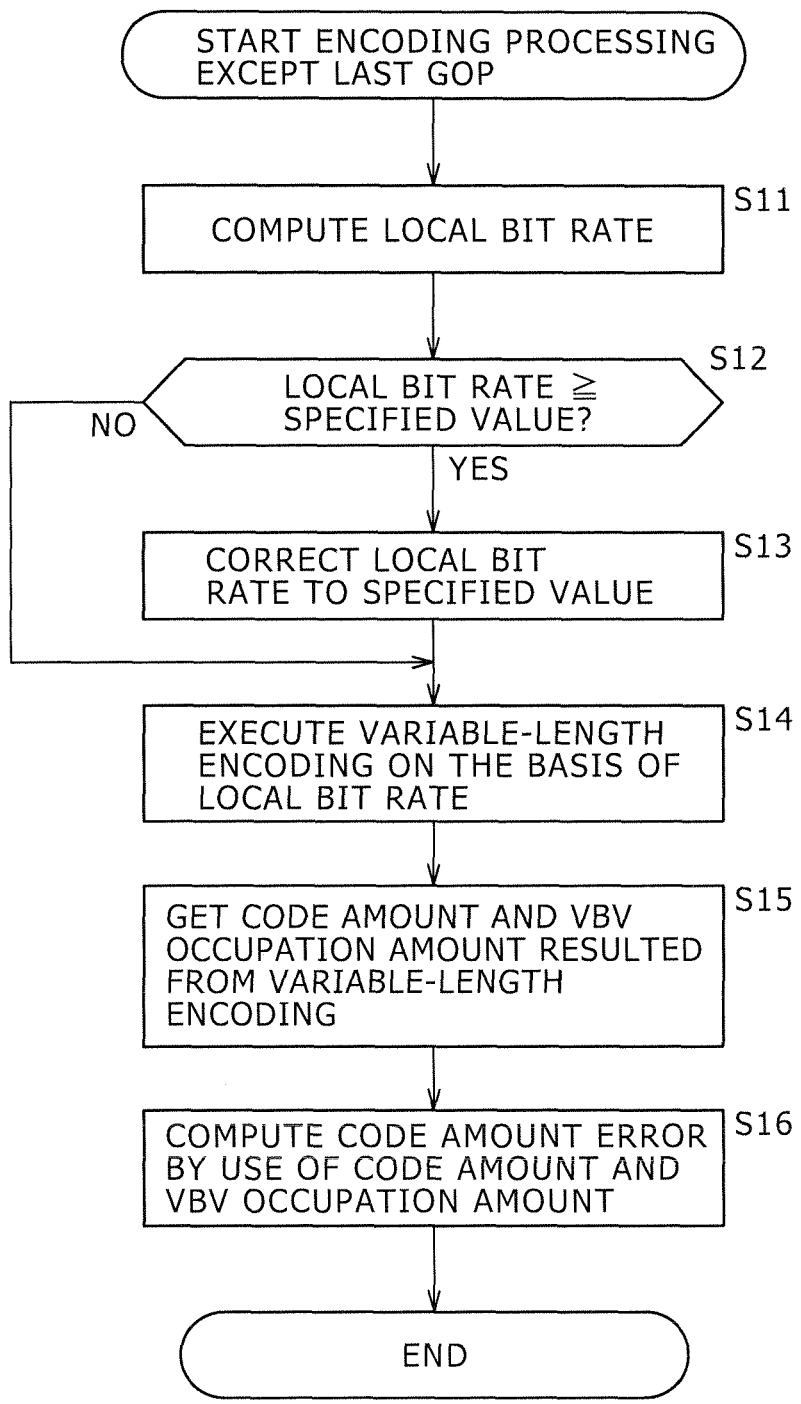
FIG. 12 is a flowchart indicative of encoding processing except for the last GOP by the recording machine shown in FIG. 8.

Referring to FIG. 12, there is shown a flowchart indicative of the encoding processing by the recording machine 11 for encoding other than the last GOP. This processing for encoding the GOPs other than the last GOP is executed for each GOP in a re-encode range other than the last GOP.

In step S11 shown in FIG. 12, using a code amount and a VBV delay of a GOP subject to base data processing, the CPU 21 computes the local bit rate of this GOP.

To be more specific, if the GOP subject to processing is the start GOP of a re-encode range, then the CPU 21 computes a local bit rate in accordance with equation (3) described above. On the other hand, if the GOP subject to processing is a GOP other than the start GOP of the re-encode range, then the CPU 21 computes the local bit rate in accordance with equation (5) above also by use of the encoding error computed by the processing of step S16 to be described later by executing the GOP before the GOP other than the start GOP.

In step S12, the CPU 21 determines whether the local bit rate computed in step S11 is equal to or higher than a specified value of the format. If the local bit rate is found to be equal to or higher than the specified value of the format, then the CPU 21 corrects the local bit rate to the specified value in step S13. This is done to prevent the newly variable-length encoded stream from violating the format and surely store the replacing data into the recording area of the base data to be replaced. Then, the CPU 21 supplies the corrected local bit rate to the encoding control portion 41, upon which the procedure goes to step S14.

On the other hand, if the local bit rate is found to be lower than the specified value of the format in step S12, then the CPU 21 supplies the local bit rate computed in step S11 to the encoding control portion 41 without change. Then, the procedure goes to step S14.

In step S14, under the control of the encoding control portion 41, the video encoder 24 executes variable-length encoding on the entered replacing data on the basis of the local bit rate of the GOP subject to processing supplied from the encoding control portion 41.

In step S15, the encoding control portion 41 obtains the code amount and the VBV occupation amount of each frame that are the results of the variable-length encoding executed in step S14 and supplies the obtained code amount and VBV occupation amount to the CPU 21.

In step S16, by use of the code amount and the VBV occupation amount of each frame supplied from the encoding control portion 41 and the code amount and the VBV occupation amount of the corresponding frame of the base data, the CPU 21 computes a code amount error of each frame from equation (4) above. This code amount error is fed back to the computation of the local bit rate of a next GOP.

Figure 13:
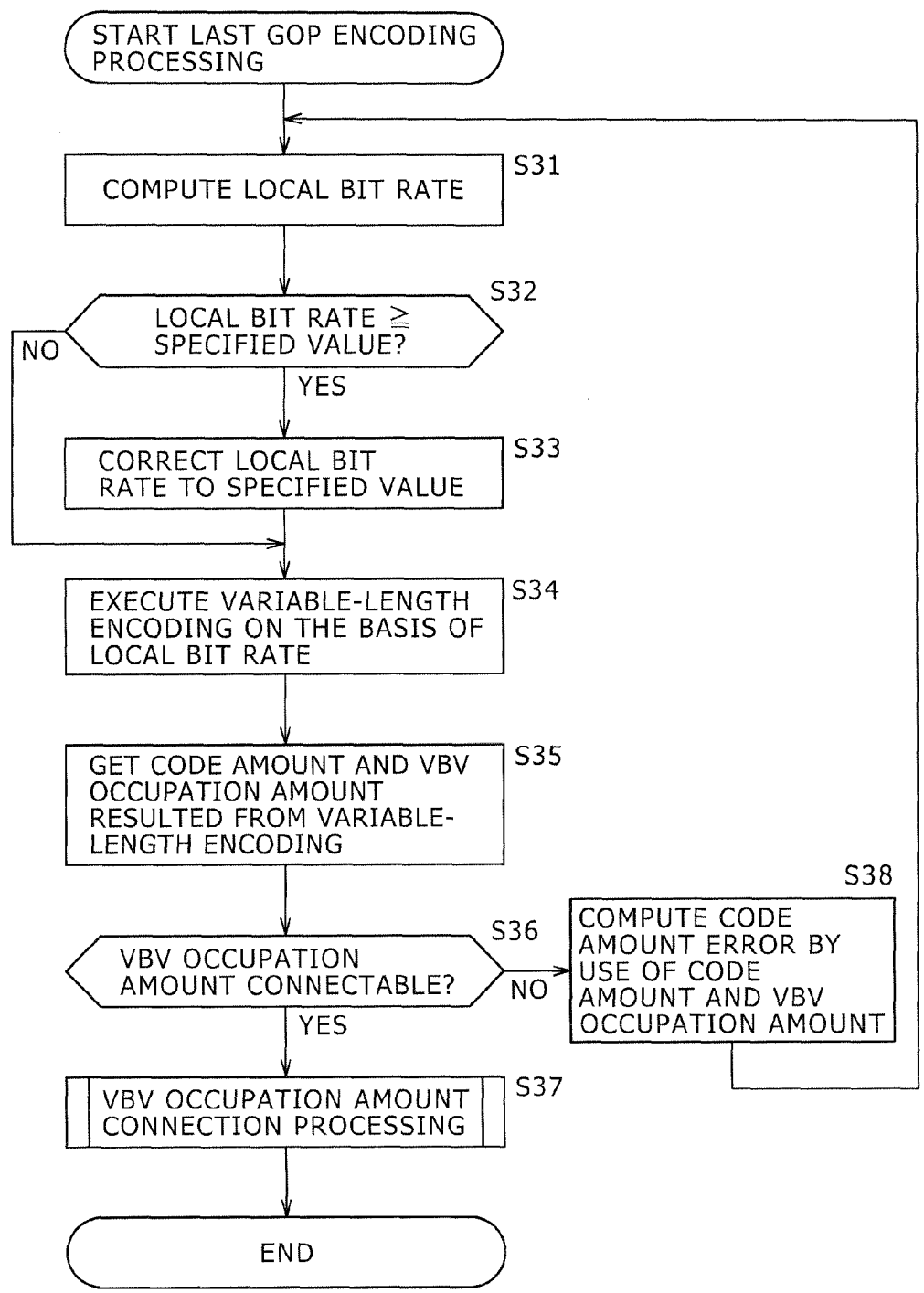
FIG. 13 is a flowchart indicative of encoding processing of the last GOP by the recording machine shown in FIG. 8.

Referring to FIG. 13, there is shown a flowchart indicative of the processing of encoding the last GOP to be executed by the recording machine 11 shown in FIG. 8. This last-GOP encoding processing is executed on the last GOP of each re-encode range.

The processing operations of steps S31 through S35 are substantially the same as those steps S11 through S15, so that the description of the former will be skipped.

After the processing of step S35, the encoding control portion 41 determines in step S36 whether the locus of the VBV occupation amount obtained by the variable-length encoding of the replacing data is connectable to the VBV occupation amount of the VBV occupation amount target picture.

If the locus of the VBV occupation amount is found to be connectable in step S36, then the encoding control portion 41 executes VBV occupation amount connection processing for connecting the VBV occupation amount in step S37, upon which the procedure comes to an end. It should be noted that the details of this VBV occupation amount connection processing will be described later with reference to the flowchart shown in FIG. 14.

On the other hand, if the locus of the VBV occupation amount is found not to be connectable in step S36, the procedure goes to step S38.

In step S38, the CPU 21 computes a code amount error in accordance with equation (5) above by use of the code amount and the VBV occupation amount of each frame obtained by the processing of step S35 and the code amount and the VBV occupation amount of the corresponding frame of the base data. Next, the CPU 21 returns the procedure to step S31 by including a frame next to the last frame of the current re-encode range into a new last GOP. Then, until the locus of the VBV occupation amount to be obtained by the variable-length encoding of the replacing data is found to be connectable to the VBV occupation amount of the VBV occupation amount target picture, the CPU 21 repeats the processing operations of steps S31 through S36 and S38.

Figure 14:
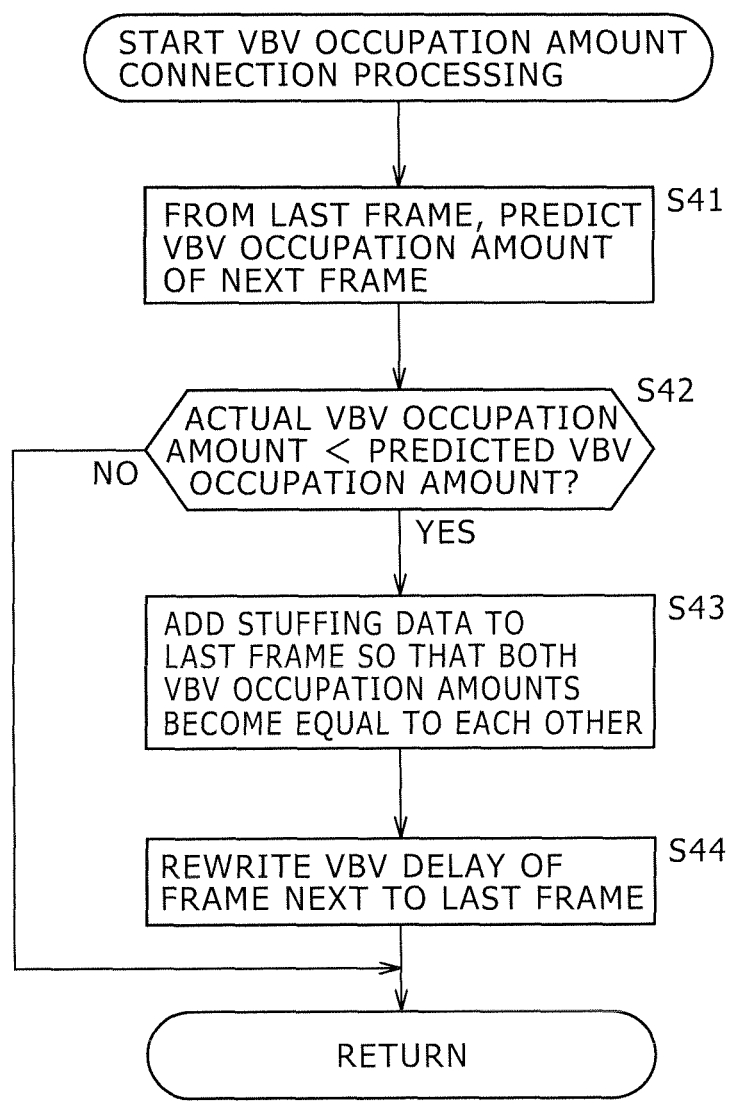
FIG. 14 is a flowchart indicative of details of VBV occupation amount connection processing in step S37 shown in FIG. 13.

Referring to FIG. 14, there is shown a flowchart indicative of the details of the VBV occupation amount connection processing of step S37 shown in FIG. 13.

In step S41 shown in FIG. 14, the encoding control portion 41 predicts the VBV occupation amount of a frame next to the last frame on the basis of the local bit rate computed by feeding back the VBV occupation amount, the code amount, and the code amount error of the replacing data of the last frame in the re-encode range.

In step S42, the encoding control portion 41 determines whether the VBV occupation amount predicted in step S41 is higher than the computed value of the actual VBV occupation amount converted from the VBV delay stored in the frame next to the last frame in the re-encode range.

If the predicted VBV occupation amount is found to be higher than the computed value of the actual VBV occupation amount in step S42, then the encoding control portion 41 adds, in step S43, stuffing data to the last frame of the re-encode range after the insert editing so as to make both the VBV occupation amounts equal to each other.

In step S44, the encoding control portion 41 recalculates the VBV delay of the frame next to the last frame of the re-encode range by use of the local bit rate used for the variable-length encoding of the re-encode range and rewrites the VBV delay. This is because the bit rate changes before or after the editing as a result of the computation of the local bit rate of the last frame with the code amount error fed back. After the end of the processing of step S44, the procedure comes to an end.

On the other hand, if the predicted VBV occupation amount is found to be not larger than the computed value of the actual VBV occupation amount in step S42, then the procedure comes to an end.

As described above, the recording machine 11 computes the local bit rate of base data, so that the bit rate of replacing data follows the bit rate of base data more correctly. As a result, the code amount of replacing data can be surely held down equal to or below the code amount of base data while maintaining the continuity of the VBV occupation amount within a quantization error range. Consequently, the insert editing executed on related-art VTRs can be successfully executed also on the recording media to which encoded streams having the long GOP structure with variable code amount.

In addition, the above-mentioned novel configuration allows the suppression of a wasted code amount as compared with a method in which replacing data is variable-length encoded with the bit rate thereof fixed sufficiently lower than that of base data to enhance the success rate of the editing. As a result, the deterioration of picture quality can be suppressed. Further, the recording machine 11 controls the variable-length encoding not by local code amount but by bit rate, so that code amounts can be efficiently distributed in accordance with replacing data without being influenced by the code amount of base data. As a result, the deflection of picture quality can be suppressed.

(2) Second Embodiment

Exemplary Configuration of an Editing System Practiced as the Second Embodiment

Figure 15:
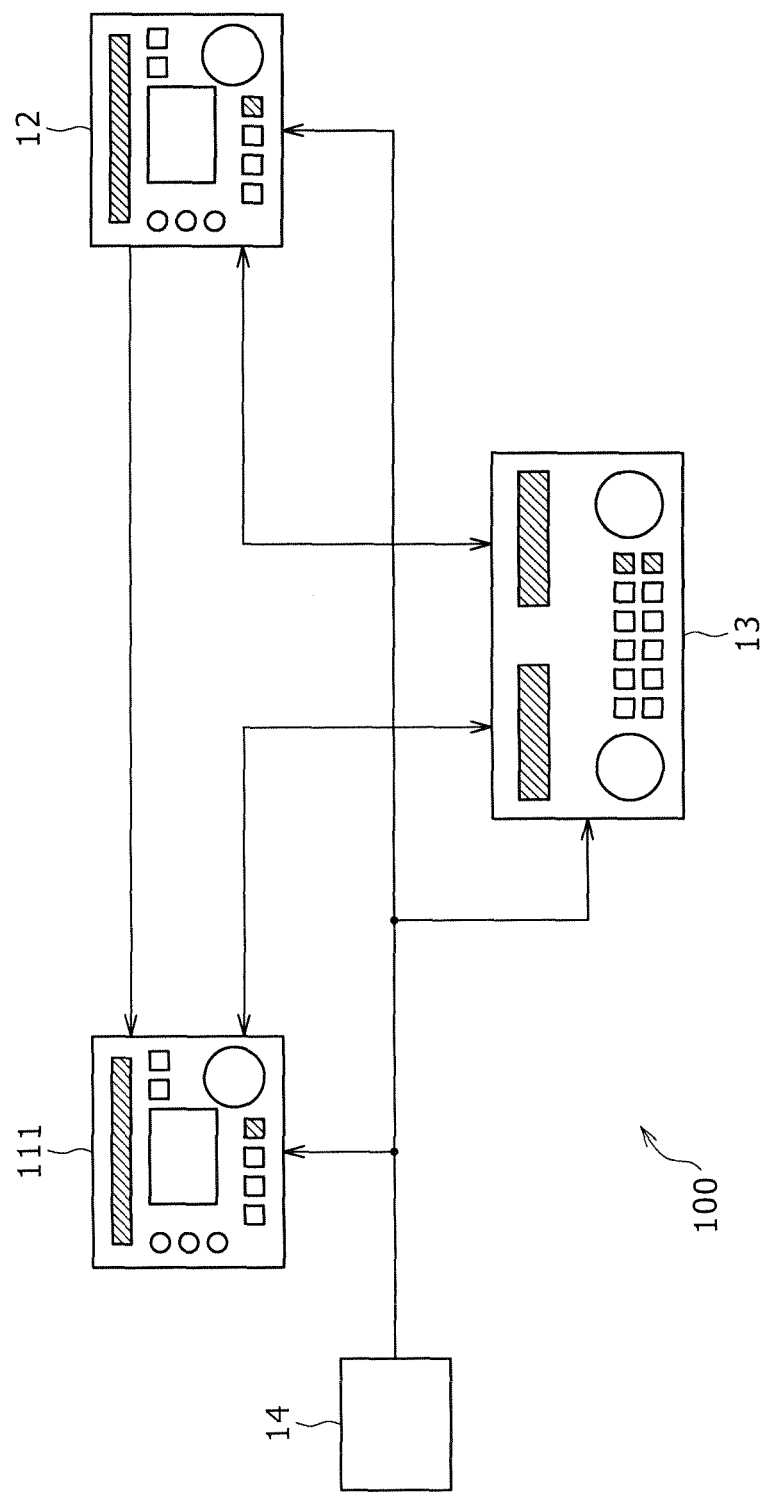
FIG. 15 is a block diagram illustrating an exemplary configuration of an editing system practiced as a second embodiment of the invention.

Referring to FIG. 15, there is shown a block diagram illustrating an exemplary configuration of an editing system practiced as the second embodiment of the invention.

Referring to FIG. 15, components similar to those previously described with reference to FIG. 7 are denoted by the same reference numerals and the description thereof is skipped.

The configuration of an editing system 100 shown in FIG. 15 is mainly different from that shown in FIG. 7 in the arrangement of a recording machine 111 instead of the recording machine 11.

Like the recording machine 11 shown in FIG. 7, the recording machine 111 shown in FIG. 15 is connected to a reproducing machine 12 with a coaxial cable. Like the recording machine 11, the recording machine 111 variable-length encodes base data in the long-GOP-structured MPEG algorithm and records the encoded base data to a recording media loaded on the recording machine 111. In addition, the recording machine 111 is connected to an editing machine 13 with a control line like the recording machine 11. Further, the recording machine 111 transmits various signals to the editing machine 13 over the control line like the recording machine 11.

In response to a control signal transmitted from the editing machine 13 over the control line, the recording machine 111 inserts edit data transmitted from the reproducing machine 12 as an HD-SDI signal into the edit range of base data recorded to a recording media. It should be noted that, at this moment, the recording machine 111 sets the lower-limit and upper-limit values of a virtual VBV occupation amount by narrowing the upper-limit and lower-limit values of the VBV occupation amount corresponding to the VBV buffer by a maximum value (hereafter referred to as an error maximum value) of an error that the VBV occupation amount can take by being converted from a VBV delay. Next, the recording machine 111 executes variable-length encoding on the replacing data so as to prevent the VBV occupation amount of the replacing data from exceeding the upper-limit value or falling below the lower-limit value of the virtual VBV occupation amount.

[Exemplary Detail Configuration of the Recording Machine]

Figure 16:
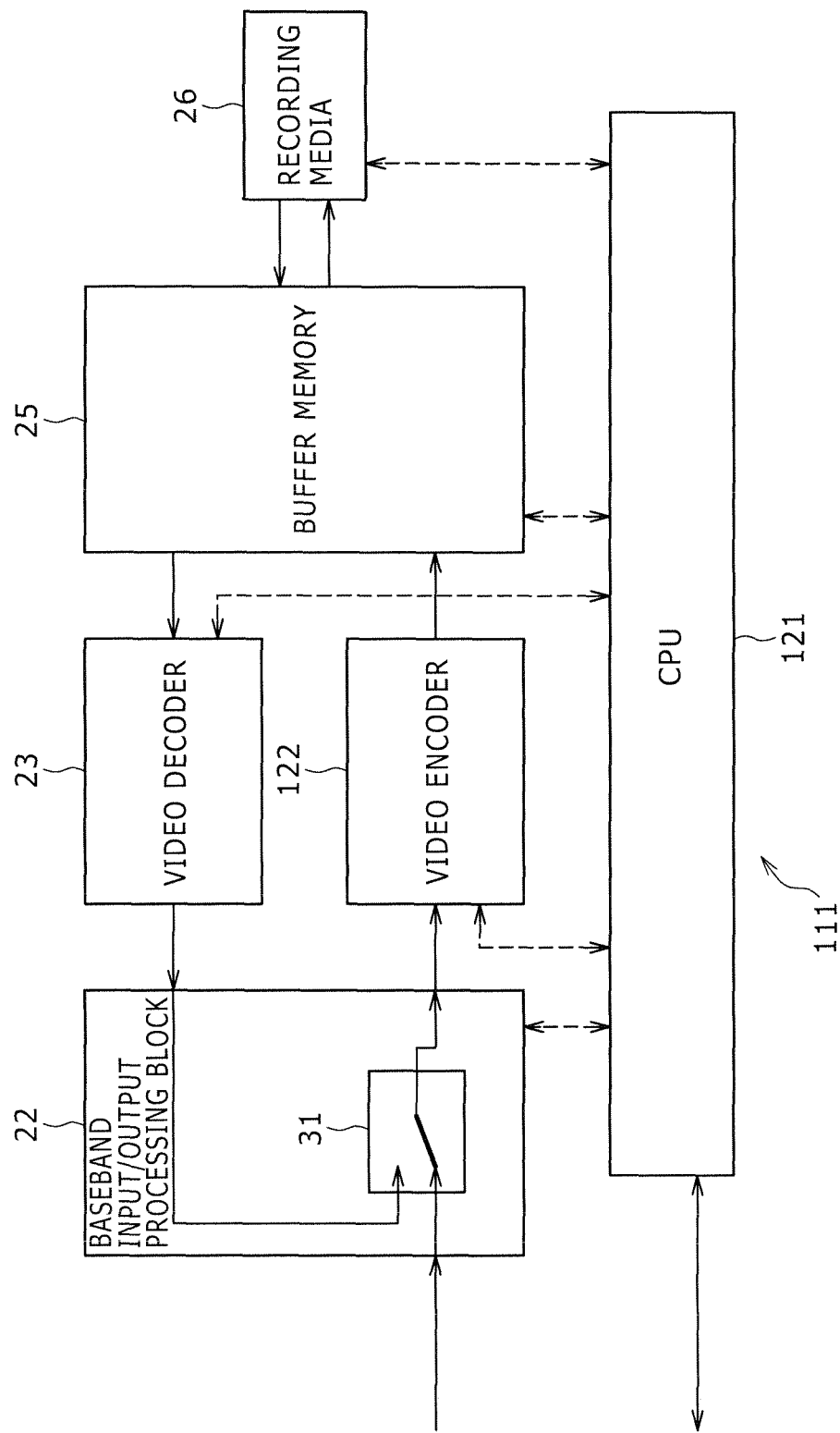
FIG. 16 is a block diagram illustrating an exemplary detail configuration of a recording machine shown in FIG. 15.

Referring to FIG. 16, there is shown a block diagram illustrating an exemplary detail configuration of the recording machine 111 shown in FIG. 15.

Referring to FIG. 16, components similar to those previously described with reference to FIG. 8 are denoted by the same reference numerals and the description thereof is skipped.

The configuration of the recording machine 111 shown in FIG. 16 is mainly different from that shown in FIG. 8 in the arrangement of a CPU 121 and an video encoder 122 instead of the CPU 21 and the video encoder 24.

On the basis of a control signal and so on supplied from the editing machine 13, the CPU 121 controls other component blocks on a frame or GOP basis.

For example, on the basis of the maximum value of the bit rate of base data, the CPU 121 computes, as an error maximum value, a value obtained by dividing that bit rate by 90000 for example and supplies the computed error maximum value to the video encoder 122. In addition, like the CPU 21 shown in FIG. 8, on the basis of a control signal indicative of a user-specified in-point supplied from the editing machine 13, the CPU 121 controls the recording media 26 to start the reading of pictures subsequent to the start picture of the GOP including an in-point supplied from the recording media 26. Further, like the CPU 21, on the basis of a control signal indicative of a user-specified out-point supplied from the editing machine 13, the CPU 121 controls the recording media 26 to stop the reading of pictures at the end of the reading of the terminal picture of the GOP including an out-point supplied from the recording media 26.

In addition, like the CPU 21, the CPU 121 monitors other component blocks. The CPU 121 transmits a signal indicative of information on the recording machine 111, such as a time code, to the editing machine 13.

The video encoder 122 executes variable-length encoding on the base data supplied from the selector 31 in the long-GOP-structured MPEG algorithm. Also, on the basis of the error maximum value supplied from the CPU 121, the video encoder 122 executes variable-length encoding on the replacing data supplied from the selector 31 in the long-GOP-structured MPEG algorithm. Like the video encoder 24, the video encoder 122 supplies the variable-length encoded replacing data or base data to the buffer memory 25 as recording data.

Figure 17:
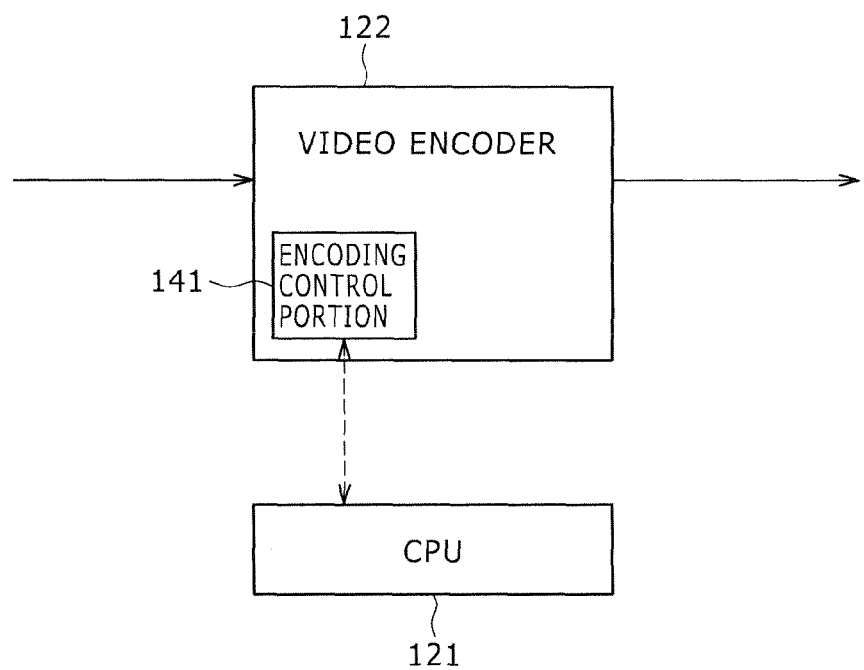
FIG. 17 is a block diagram illustrating details of processing by a CPU and a video encoder.

FIG. 17 illustrates details of the processing by the CPU 121 and the video encoder 122 in executing variable-length encoding on replacing data.

As shown in FIG. 17, on the basis of the maximum value of the bit rate of base data for example, the CPU 121 computes a value obtained by dividing that bit rate by 90000 for example as an error maximum value and supplies the computed error maximum value to the video encoder 122:

The video encoder 122 has an encoding control portion 141 for controlling the variable-length encoding of replacing data supplied from a selector 31 (refer to FIG. 16). The encoding control portion 141 executes encoding control in a unit finer than that of the control by the CPU 121 on a frame or GOP basis.

To be more specific, on the basis of an error maximum value supplied from the CPU 121, the encoding control portion 141 uses, as a virtual upper-limit value of a VBV occupation amount, a value obtained by subtracting the error maximum value from the upper-limit value of the actual VBV occupation amount corresponding to the VBV buffer, for example. In addition, on the basis of an error maximum value supplied from the CPU 121, the encoding control portion 141 uses, as a virtual lower-value of a VBV occupation amount, a value obtained by adding the error maximum value to the lower-limit value of the actual VBV occupation amount corresponding to the VBV buffer, for example. Then, the encoding control portion 141 controls the variable-length encoding of the replacing data by the video encoder 122 so as to prevent the VBV occupation amount of the replacing data from exceeding the upper-limit value or falling below the lower-limit value of the virtual VBV occupation amount.

It should be noted that, in the second embodiment, an error maximum value is a fixed value, such as a maximum value/90000 of the bit rate of base data; it is also practicable to provide an error maximum value that varies depending on local bit rates if the recording machine 111 computes a local bit rate as with the recording machine 11. In this case, an error maximum value is determined for each GOP on the basis of a local bit rate.

[Description of the Variable-Length Encoding of Replacing Data]

Figure 18:
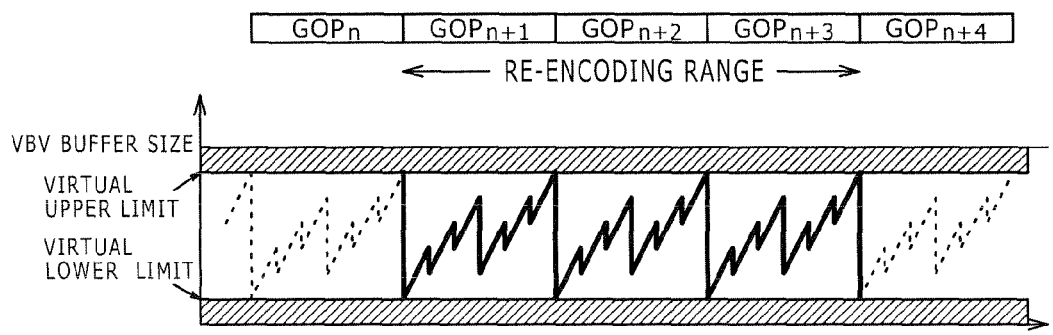
FIG. 18 is a diagram illustrating the variable-length encoding of replacing data under the control of an encoding control portion.
Figure 19:
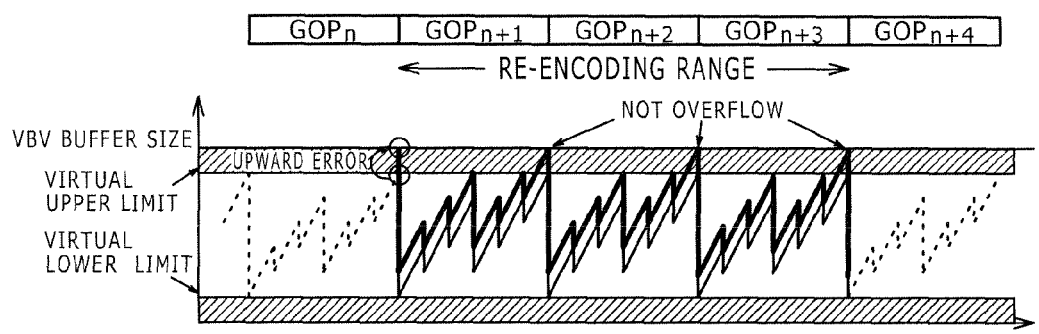
FIG. 19 is another diagram illustrating the variable-length encoding of replacing data under the control of an encoding control portion.
Figure 20:
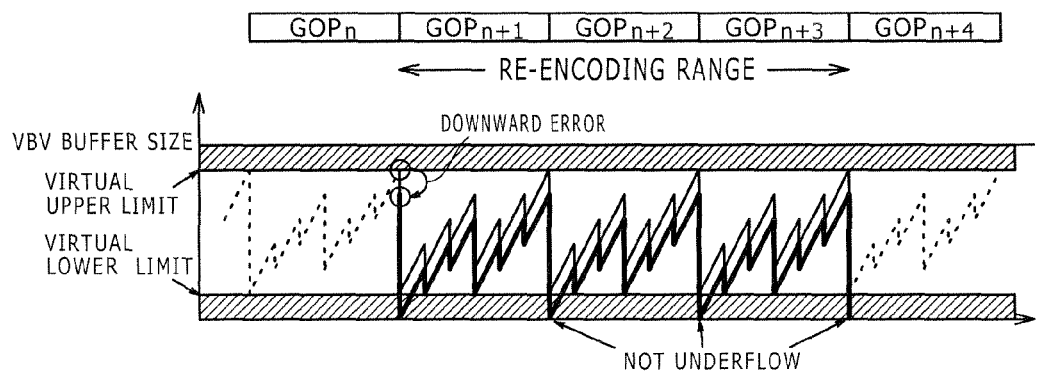
FIG. 20 is still another diagram illustrating the variable-length encoding of replacing data under the control of an encoding control portion.

FIG. 18 through FIG. 20 illustrate the variable-length encoding of replacing data that is executed under the control of the encoding control portion 141.

It should be noted that, in FIG. 18 through FIG. 20, dashed lines are indicative of temporal changes of the VBV occupation amount of base data. In FIG. 18, thick solid lines are indicative of temporal changes of the VBV occupation amount of replacing data when an occupation amount error is 0. In FIG. 19 and FIG. 20, thick solid lines are indicative of temporal changes of the VBV occupation amount of replacing data when an occupation amount error is not 0 and thin solid lines are indicative of temporal changes of the VBV occupation amount of replacing data if an occupation amount error is 0.

Because replacing data is variable-length encoded so as not for the VBV occupation amount of replacing data to exceed the upper-limit value or falling below the lower-limit value of a virtual VBV occupation amount, the VBV occupation amount of replacing data falls within a range from the lower-limit value of the virtual occupation amount to the upper-limit value thereof if an occupation amount error is 0 as shown in FIG. 18.

As shown in FIG. 19, if an occupation amount error of the start picture of a re-encode range is an error maximum value in the upward direction, then the VBV occupation amount of replacing data exceeds the upper-limit value to a virtual VBV occupation amount. However, because the occupation amount error of the VBV occupation amount of the start picture is an error maximum value, the VBV occupation amount of replacing data does not exceed the upper-limit value of the actual VBV occupation amount corresponding to the VBV buffer. Therefore, no overflow occurs.

On the other hand, as shown in FIG. 20, if the occupation amount error of the start picture of a re-encode range is an error maximum value in the downward direction, the VBV occupation amount of replacing data falls below the lower-limit value of the virtual VBV occupation amount. However, because the occupation amount error of the VBV occupation amount of the start picture is an error maximum value, the VBV occupation amount of replacing data does not fall below the lower-limit value of the actual VBV occupation amount corresponding to the VBV buffer. Therefore, no underflow occurs.

As described above, the recording machine 111 executes variable-length encoding on replacing data by narrowing the upper-limit and lower-limit values of the actual VBV occupation amount corresponding to the VBV buffer by an error maximum value, so that, if an occupation amount error caused by the conversion from the VBV delay is a maximum value, the locus of the VBV occupation amount of replacing data does not exceed the upper-limit value or the lower-limit value of the actual VBV occupation amount. Therefore, neither underflow nor overflow occurs in the edited data.

It should be noted that if the VBV occupation amount of the start picture of a re-encode range is in excess of the upper-limit value or lower-limit value of a virtual VBV occupation amount, then, in order to execute VBV occupation amount connection, variable-length encoding may be executed on replacing data by leaving the upper-limit and lower-limit values of the VBV occupation amount of the start picture to the upper-limit and lower-limit values of the actual VBV occupation amount. In this case, the upper-limit and lower-limit values of the VBV occupation amount of the pictures subsequent to the start picture may be set to the upper-limit and lower-limit values of the virtual VBV occupation amount. Also, one of the upper-limit and lower-limit values of the VBV occupation amount of the pictures subsequent to the start picture may be set to the VBV occupation amount of the start picture. Obviously, it is practicable not to execute the variable-length encoding itself on replacing data.

If the VBV occupation amount of a VBV occupation amount target picture is in excess of the upper-limit value or the lower-limit value of a virtual VBV occupation amount, then VBV occupation amount connection processing may be executed without change or variable-length encoding may be continued until the VBV occupation amount target picture becomes a picture that corresponds to a VBV occupation amount that does not exceed the upper-limit value and does not fall below the lower-limit value, either, of the virtual VBV occupation amount.

Further, if the VBV occupation amount of the start picture of a re-encode range is in excess of the upper-limit value or the lower-limit value of the virtual VBV occupation amount, the encoding control portion 141 may correct this upper-limit value or this lower-limit value to the VBV occupation amount of the start picture; if the VBV occupation amount of the VBV occupation amount target picture is in excess of the upper-limit value or the lower-limit value of the virtual VBV occupation amount, then the encoding control portion 141 may correct this upper-limit value or this lower-limit value to the VBV occupation amount of the VBV occupation amount target picture.

[Description of Processing to be Executed by the Recording Machine]

Figure 21:
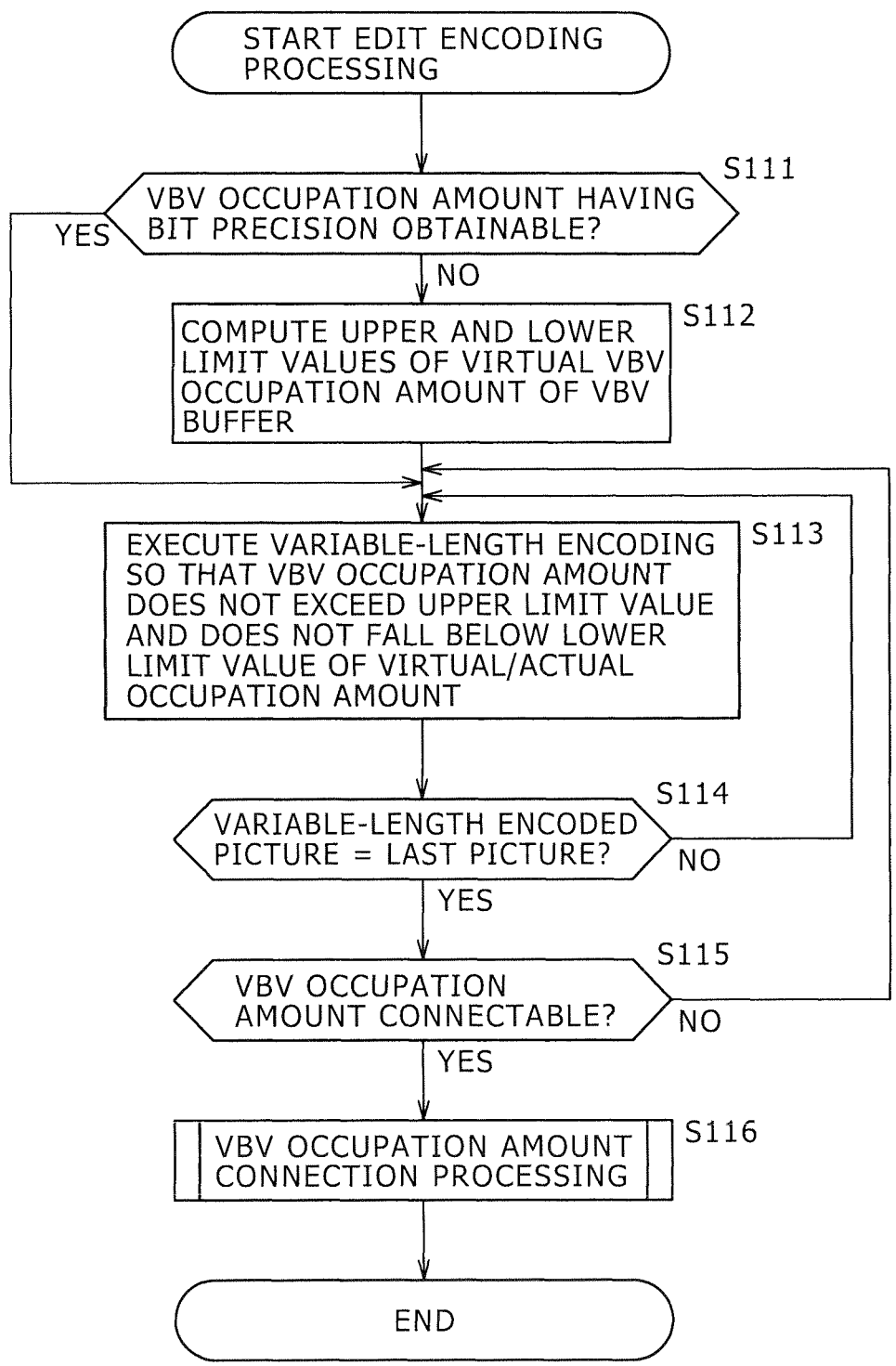
FIG. 21 is a flowchart indicative of edit encoding processing by the recording machine shown in FIG. 16.

Referring to FIG. 21, there is shown a flowchart indicative of edit encoding processing to be executed by the recording machine 111 shown in FIG. 16. This edit encoding processing is started when replacing data is entered in the video encoder 122, for example.

In step S111 shown in FIG. 21, the CPU 121 (refer to FIG. 17) determines whether a VBV occupation amount having bit precision is obtainable from the variable-length encoded base data. The encoding control portion 141 may make this determination in accordance with an input made externally or by analyzing the variable-length encoded base data.

If the VBV occupation amount having bit precision is found to be unobtainable in step S111, then the CPU 121 computes an error maximum value from the maximum value of the bit rate of the base data included in the variable-length encoded based data and supplies the computed error maximum value to the encoding control portion 141. Next, in step S112, on the basis of the error maximum value supplied from the CPU 121, the encoding control portion 141 computes the upper-limit and lower-limit values of a virtual VBV occupation amount. Then, the procedure goes to step S113.

On the other hand, if the VBV occupation amount having bit precision is found to be obtainable in step S111, then the procedure goes to step S113.

If the processing of step S112 has been executed, the video encoder 122 executes, in step S113, variable-length encoding on the replacing data under the control of the encoding control portion 141 so as to prevent the VBV occupation amount from exceeding the upper-limit value or falling below the lower-limit value of the virtual VBV occupation amount. If the processing of step S112 has not been executed, the video encoder 122, under the control of the encoding control portion 141, executes variable-length encoding on the replacing data so as to prevent the VBV occupation amount from exceeding the upper-limit value or falling below the lower-limit value of the actual VBV occupation amount corresponding to VBV buffer.

In step S114, the video encoder 122 determines whether the variable-length encoded picture is the last picture of the re-encode range or not. If the variable-length encoded picture is found to be not the last picture of the re-encode range in step S114, then the procedure returns to step S113 to repeat the processing operations of step S113 and step S114 until the variable-length encoded picture becomes the last picture of the re-encode range.

On the other hand, if the variable-length encoded picture is found to be the last picture in step S114, then the procedure goes to step S115. In step S115, the encoding control portion 141 determines whether the locus of the VBV occupation amount obtained by the variable-length encoding of the replacing data is connectable with the VBV occupation amount of the VBV occupation amount target picture.

If the locus of the VBV occupation amount is found to be connectable in step S115, then the encoding control portion 141 executes the VBV occupation amount connection processing shown in FIG. 14 in step S116.

On the other hand, if the locus of the VBV occupation amount is found to be not connectable in step S115, then the encoding control portion 141 includes, in the re-encode range, a frame next to the last frame of the current re-encode range and returns the procedure to step S113. Then, the processing operations of step S113 through step S115 are repeated until the locus of the VBV occupation amount obtained by the variable-length encoding of the replacing data is found to be connectable with the VBV occupation amount of the VBV occupation amount target picture.

The above-mentioned processing allows the recording machine 111 to execute insert editing also on an encoded stream with which the VBV occupation amount of bit precision having the long GOP structure cannot be obtained without involving VBV buffer overflow or underflow. Consequently, the insert editing practiced on related-art VTRs can be surely and successfully executed also on recording media on which encoded streams having the log GOP structure of variable code amounts are recorded.

(3) Third Embodiment

Exemplary Configuration of an Editing System Practiced as the Third Embodiment

Figure 22:
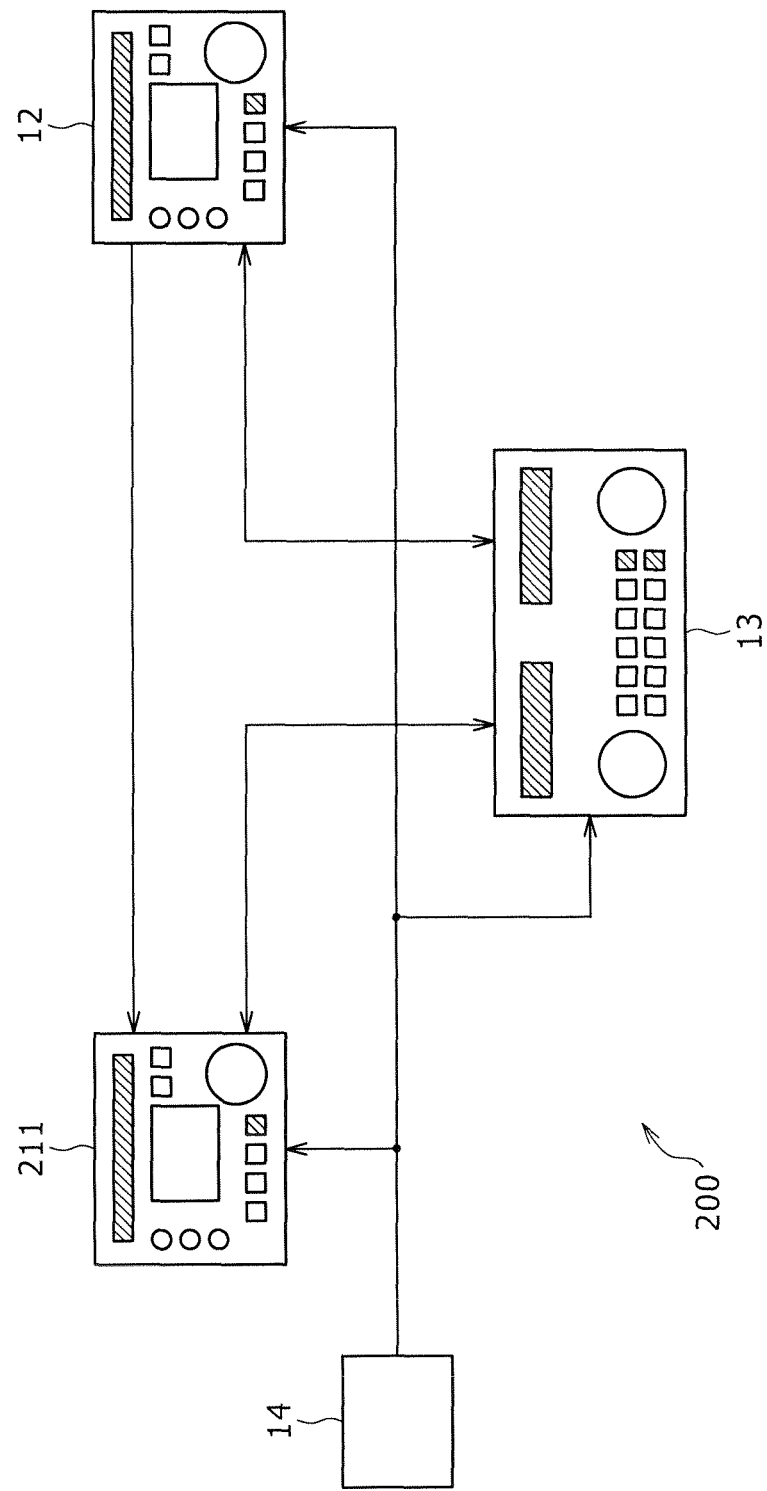
FIG. 22 is a block diagram illustrating an editing system practiced as a third embodiment of the invention.

Referring to FIG. 22, there is shown a block diagram illustrating an exemplary configuration of an editing system practiced as the third embodiment of the invention.

Referring to FIG. 22, components similar to those previously described with reference to FIG. 7 are denoted by the same reference numerals and the description thereof is skipped.

The configuration of an editing system 200 shown in FIG. 22 is mainly different from that shown in FIG. 7 in the arrangement of a recording machine 211 instead of the recording machine 11.

The recording machine 211 shown in FIG. 22 is connected to a reproducing machine 12 with a coaxial cable like the recording machine 11 shown in FIG. 7. Like the recording machine 11, the recording machine 211 variable-length encodes base data in the long-GOP-structured MPEG algorithm and records the encoded base data to a recording media loaded on the recording machine 211. Also, the recording machine 211 is connected to an editing machine 13 with a control line like the recording machine 11. Further, like the recording machine 11, the recording machine 211 transmits various signals to the editing machine 13 over the control line.

In response to a control signal transmitted from the editing machine 13 over the control line, the recording machine 211 inserts edit data transmitted from the reproducing machine 12 as an HD-SDI signal into the edit range of base data recorded to the recording media. It should be noted that, at this moment, the recording machine 211 computes the VBV occupation amount of a VBV occupation amount target picture from a value obtained by adding 1 to the VBV delay of the VBV occupation amount target picture and variable-length encodes the replacing data on the basis of the computed VBV occupation amount.

[Exemplary Detail Configuration of the Recording Machine]

Figure 23:
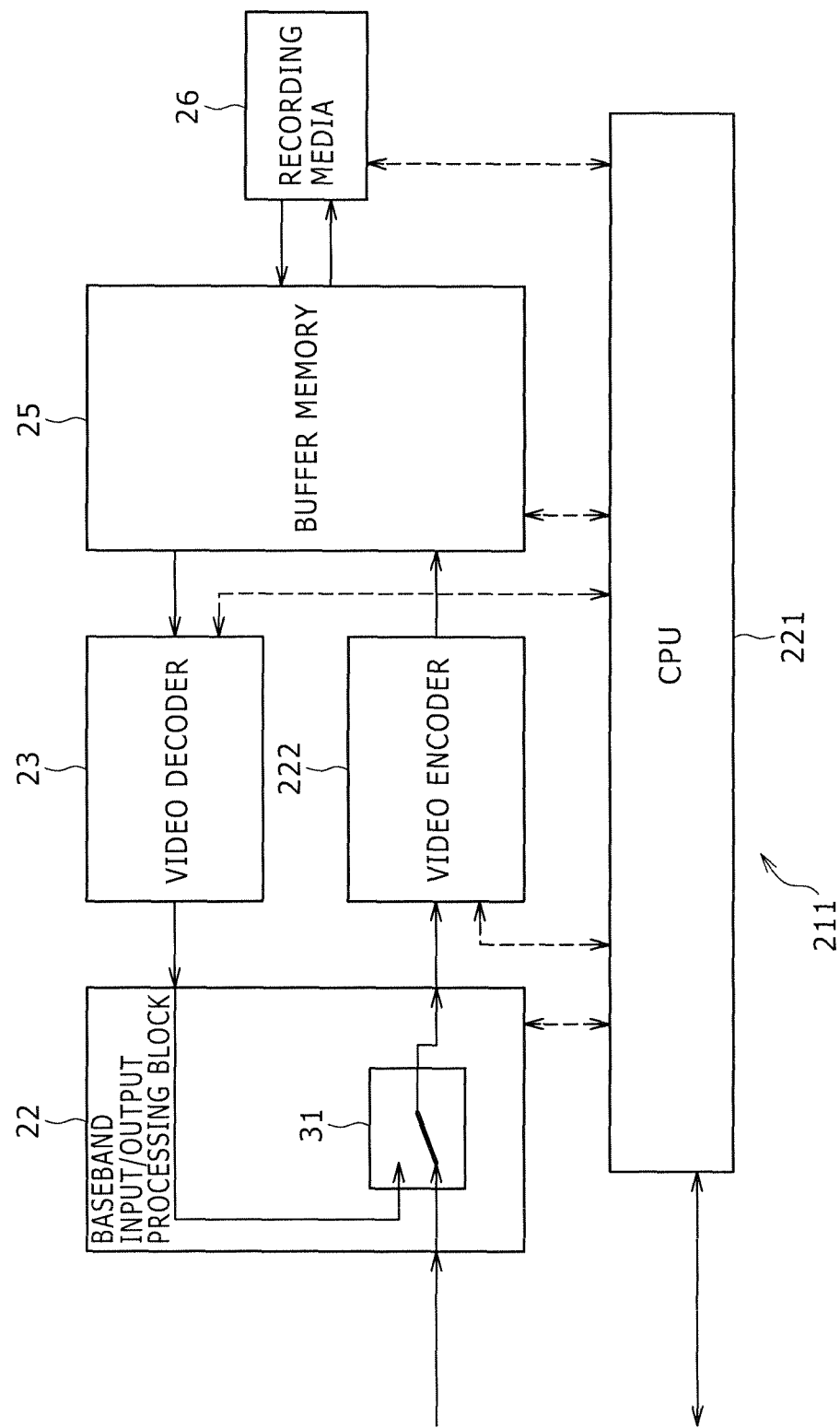
FIG. 23 is a block diagram illustrating an exemplary detail configuration of a recording machine shown in FIG. 22.

Referring to FIG. 23, there is shown a block diagram illustrating an exemplary detail configuration of the recording machine 211 shown in FIG. 22.

Referring to FIG. 23, components similar to those previously described with reference to FIG. 8 are denoted by the same reference numerals and the description thereof is skipped.

The configuration of the recording machine 211 shown in FIG. 23 is mainly different from the configuration shown in FIG. 8 in that a CPU 221 and a video encoder 222 are arranged instead of the CPU 21 and the video encoder 24.

On the basis of controls signals and so on from the editing machine 13, the CPU 221 controls other component blocks on a frame or GOP basis.

For example, the CPU 221 (the computation block) computes the VBV occupation amount of a VBV occupation amount target picture from a value obtained by adding 1 to the VBV delay of the VBV occupation amount target picture and supplies the computed VBV occupation amount to a video encoder 222. Like the CPU 21 shown in FIG. 8, the CPU 221 controls a recording media 26 on the basis of a control signal indicative of a user-specified in-point supplied from the editing machine 13 to start the reading of pictures subsequent to the start picture of a GOP including an in-point supplied from the recording media 26. In addition, like the CPU 21, the CPU 221 controls the recording media 26 on the basis of a control signal indicative of a user-specified out-point supplied from the editing machine 13 to stop the reading of the pictures subsequent to the start picture upon the end of the reading of the terminal picture of the GOP including an out-point supplied from the recording media 26.

Further, like the CPU 21, the CPU 221 monitors the other component blocks. The CPU 221 transmits a signal indicative of information on the recording machine 211, such as a time code, to the editing machine 13.

The video encoder 222 variable-length encodes the base data supplied from the selector 31 in the long-GOP structured MPEG algorithm. Also, on the basis of the VBV occupation amount of the VBV occupation amount target picture supplied from the CPU 221, the video encoder 222 variable-length encodes the replacing data supplied from the selector 31 in the long-GOP-structured MPEG algorithm. Moreover, like the video encoder 24 shown in FIG. 8, the video encoder 222 supplies the variable-length encoded replacing data or base data to a buffer memory 25 as recording data.

Figure 24:
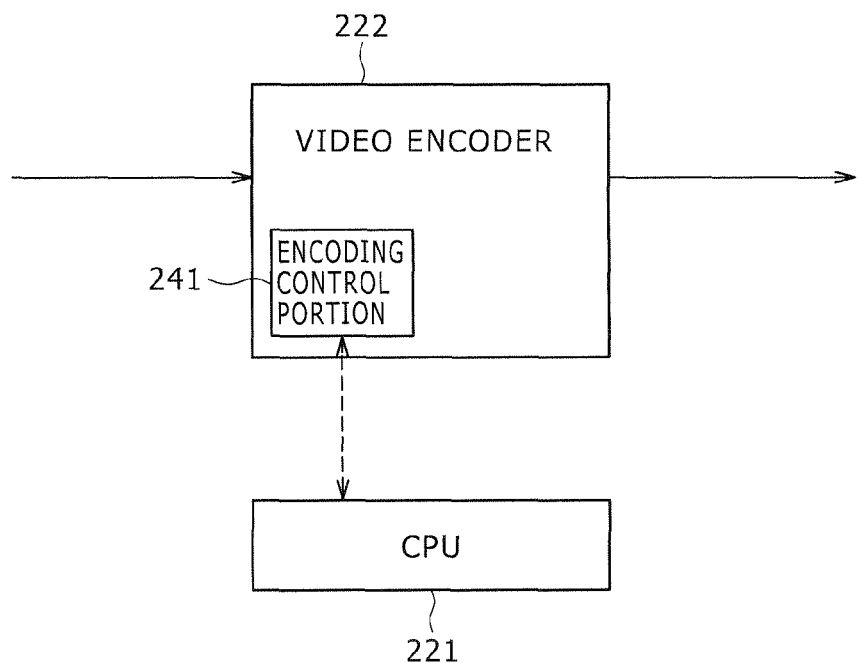
FIG. 24 is a block diagram illustrating details of processing by a CPU and a video encoder.

Referring to FIG. 24, there is shown a diagram illustrating details of the processing by the CPU 221 and the video encoder 222.

As shown in FIG. 24, the CPU 221 computes the VBV occupation amount of a VBV occupation amount target picture from a value obtained by adding 1 to the VBV delay of the VBV occupation amount target picture and supplies the computed VBV occupation amount to the video encoder 222.

The video encoder 222 has an encoding control portion 241 for controlling the variable-length encoding of replacing data supplied from the selector 31 (refer to FIG. 23). The encoding control portion 241 executes encoding control in a unit finer than that of the control by the CPU 221 on a frame or GOP basis.

To be more specific, the encoding control portion 241 controls the variable-length encoding of replacing data by the video encoder 222 (the encoding block) so as to the VBV occupation amount of the last picture of replacing data connects to the VBV occupation amount of the VBV occupation amount target picture supplied from the CPU 221, for example.

It should be noted that the computation of the VBV occupation amount of the VBV occupation amount target picture from a value obtained by adding 1 to the VBV delay of the VBV occupation amount target picture is equivalent to the rounding up that is executed when the VBV occupation amount is quantized into the VBV delay. Therefore, the variable-length encoding of the replacing data on the basis of the VBV occupation amount of the VBV occupation amount target picture thus computed prevents the code amount of the replacing data from exceeding the code amount of the base data even if the VBV occupation amount has an occupation amount error. It should be noted that the handling of decimal places at the quantization of the VBV delay is not specified by the standard concerned.

[Effects of the Computation of the VBV Occupation Amount of VBV Occupation Amount Target Picture]

Figure 25:
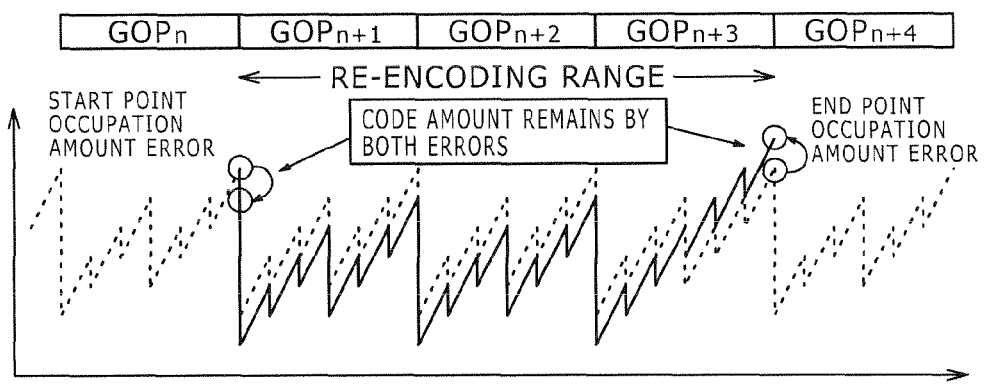
FIG. 25 is a diagram illustrating effects obtained by the computation of the VBV occupation amount of a VBV occupation amount target picture in the CPU.

Referring to FIG. 25, there is shown a diagram illustrating effects of the VBV occupation amount of VBV occupation amount target picture in the CPU 221.

The CPU 221 computes the VBV occupation amount of a VBV occupation amount target picture from a value obtained by adding 1 to the VBV delay of the VBV occupation amount target picture, so that, as shown in FIG. 25, the VBV occupation amount of the last picture has an occupation amount error in the upward direction. Accordingly, if the VBV occupation amount of the start picture of a re-encode range has an occupation amount error in the downward direction, a code amount of base data remains by an occupation amount error between both of the start picture and the last picture, so that the code amount of replacing data does not exceed the code amount of base data.

It should be noted that, if the VBV occupation amount of a VBV occupation amount target picture from a value obtained by adding 1 to the VBV delay of the VBV occupation amount target picture exceeds the upper-limit value or falls below the lower-limit value of the actual VBV occupation amount corresponding to the VBV buffer, the re-encode range is extended until this VBV occupation amount does not exceed the upper-limit value and does not fall below lower-limit value, either.

[Description of the Processing by the Recording Machine]

Figure 26:
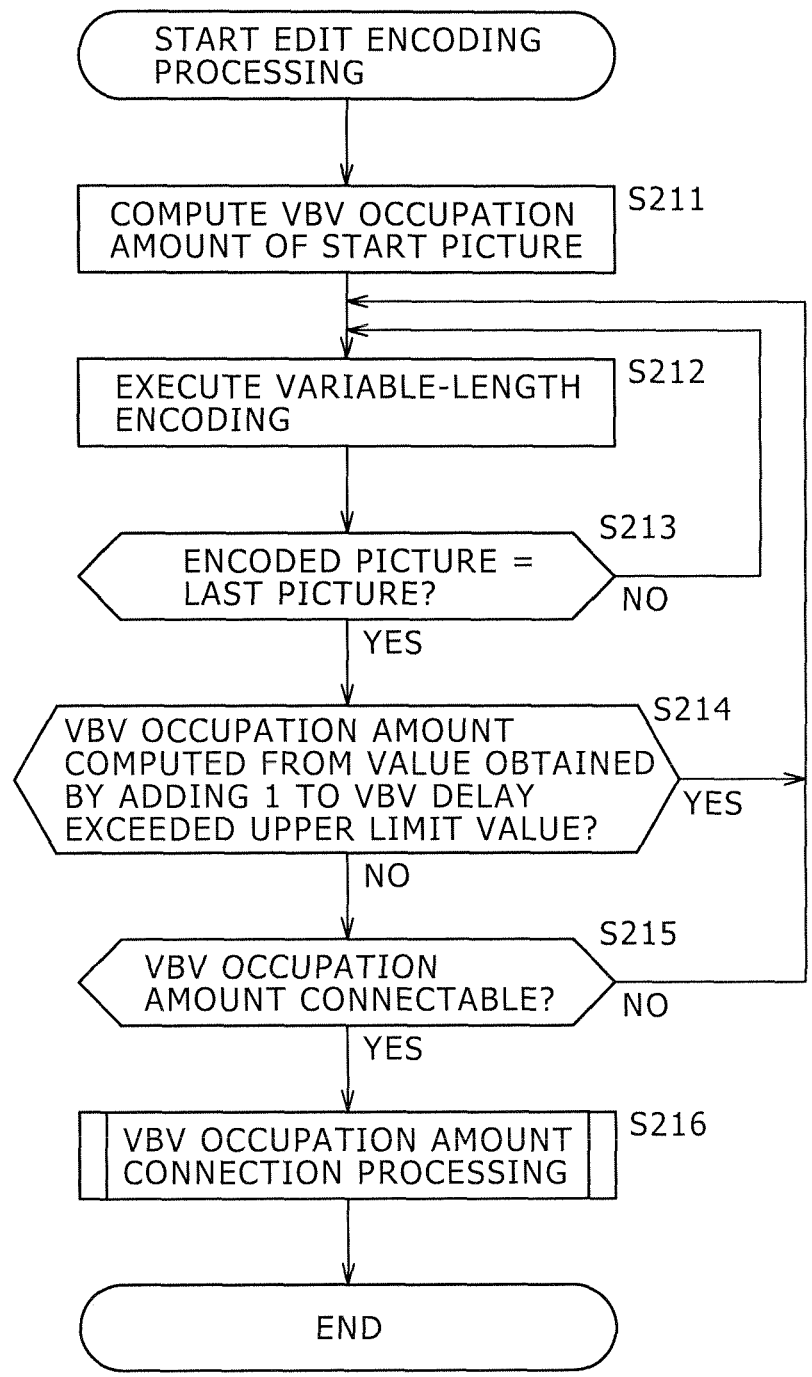
FIG. 26 is a flowchart indicative of edit encoding processing of the recording machine shown in FIG. 23.

FIG. 26 is a flowchart indicative of the edit encoding processing to be executed by the recording machine 211 shown in FIG. 23. This edit encoding processing starts when replacing data is entered in the video encoder 222, for example.

In step S211 shown in FIG. 26, the CPU 221 (refer to FIG. 24) computes a VBV occupation amount of the start picture of the re-encode range and supplies the computed VBV occupation amount to the encoding control portion 241.

In step S212, under the control of the encoding control portion 241, the video encoder 222 variable-length encodes replacing data such that the VBV buffer will not overflow or underflow with the VBV occupation amount computed in step S211 used as the origin.

In step S213, the video encoder 222 determines whether the encoded picture is the last picture of the re-encode range or not. If the encoded picture is found not to be the last picture of the re-encode range in step S213, then the procedure is returned to step S212 to repeat the processing operations of step S212 and S213 until the encoded picture becomes the last picture of the re-encoded range.

On the other hand, if the encoded picture is found to be the last picture of the re-encode range in step S213, then the CPU 221 computes the VBV occupation amount of a VBV occupation amount target picture from a value obtained by adding 1 to the VBV delay of the VBV occupation amount target picture and supplies the computed VBV occupation amount to the encoding control portion 241. Next, in step S214, the encoding control portion 241 determines whether the VBV occupation amount of the VBV occupation amount target picture computed from the value obtained by adding 1 to the VBV delay of the VBV occupation amount target picture supplied from the CPU 221 has exceeded the upper-limit value of the actual VBV occupation amount corresponding to the VBV buffer.

If the VBV occupation amount of the VBV occupation amount target picture is found not exceeding the upper-limit value of the actual VBV occupation amount of the VBV occupation amount target picture in step S214, then the procedure goes to step S215.

In step S215, the encoding control portion 241 determines whether the locus of the VBV occupation amount obtained by the variable-length encoding of replacing data is connectable to the VBV occupation amount of the VBV occupation amount target picture.

If the locus of the VBV occupation amount is found to be connectable in step S215, then the encoding control portion 241 executes the VBV occupation amount connection processing shown in FIG. 14 to end the above-mentioned processing in step S216.

On the other hand, if the VBV occupation amount of the VBV occupation amount target picture is found exceeding the actual VBV occupation amount in step S214 or, if the locus of the VBV occupation amount is found to be not connectable in step S215, then encoding control portion 241 includes a frame next to the last frame of the current re-encode range into a re-encode range to return the procedure to step S212. Then, the processing operations of step S212 through step S215 are repeated until the VBV occupation amount of the VBV occupation amount target picture does not exceed the upper-limit of the actual VBV occupation amount and the locus of the VBV occupation amount obtained by the variable-length encoding of the replacing data is found connectable to the VBV occupation amount of the VBV occupation amount target picture.

It should be noted that the edit encoding processing may be executed only if there is a match between the bit rate of base data and the bit rate of replacing data.

The above-mentioned processing allows the recording machine 211 to surely store the replacing data in the recording area of the base data to be replaced if there is a match between the bit rate of the base data and the bit rate of the replacing data. Consequently, the insert editing practiced on related-art VTRs can be surely and successfully executed also on recording media on which encoded streams having the log GOP structure of variable code amounts are recorded.

Like the recording machine 111, the recording machine 211 may set the upper-limit and lower-limit values of a virtual VBV occupation amount. In this case, the encoding control portion 241 determines in step S214 whether the VBV occupation amount of the VBV occupation amount target picture has exceeded the upper-limit value of the virtual VBV occupation amount.

(4) Fourth Embodiment

Exemplary Configuration of an Editing System Practiced as the Fourth Embodiment

Figure 27:
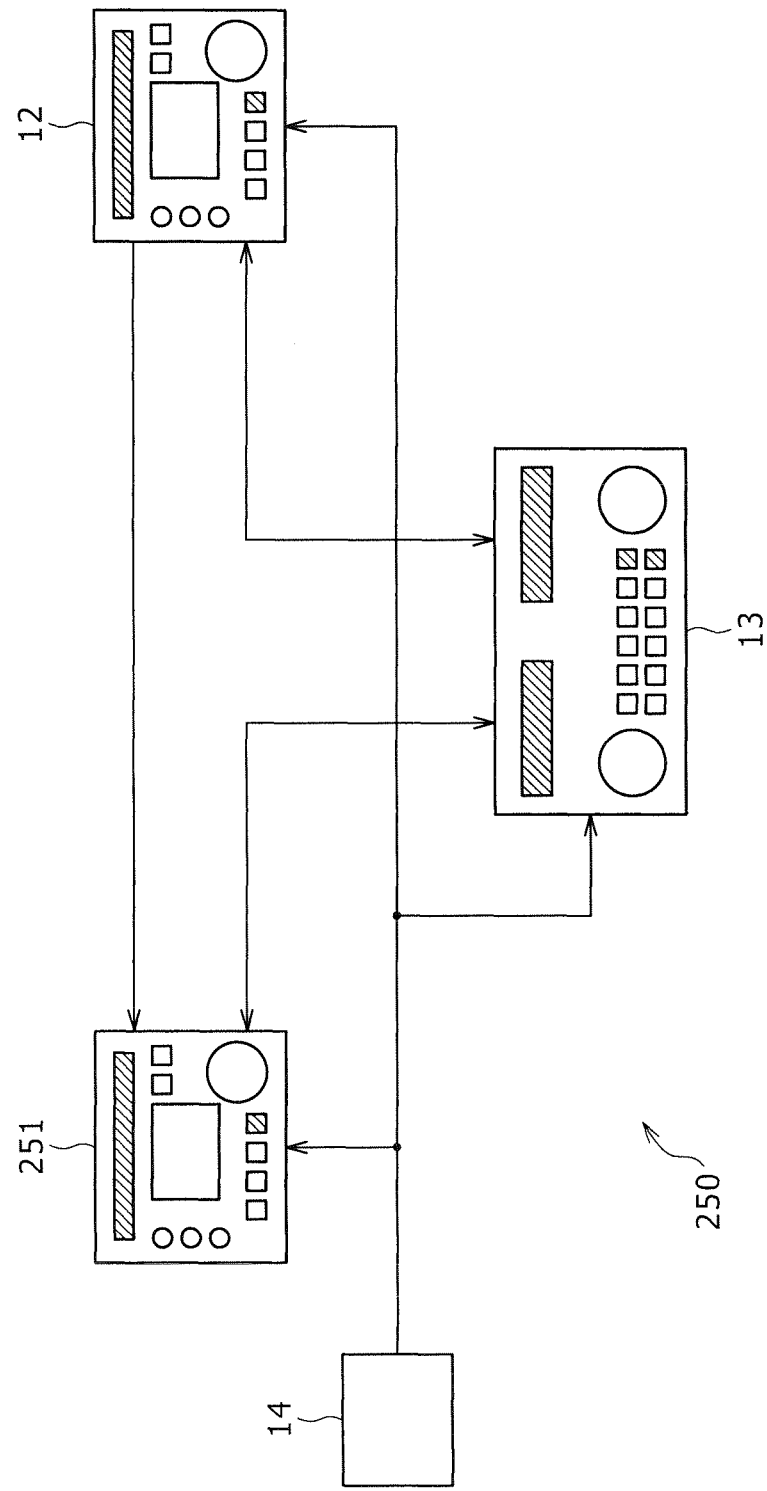
FIG. 27 is a block diagram illustrating an exemplary configuration of an editing system practiced as a fourth embodiment of the invention.

Referring to FIG. 27, there is shown a block diagram illustrating an exemplary configuration of an editing system practiced as the fourth embodiment of the invention.

Referring to FIG. 27, components similar to those previously described with reference to FIG. 7 are denoted by the same reference numerals and the description thereof is skipped.

The configuration of an editing system 250 shown in FIG. 27 is mainly different from the configuration shown in FIG. 7 in that a recording machine 251 is arranged instead of the recording machine 11.

Like the recording machine 11 shown in FIG. 7, the recording machine 251 shown in FIG. 27 is connected to a reproducing machine 12 with coaxial cable. Like the recording machine 11, the recording machine 251 variable-length encodes base data in the long-GOP-structured MPEG algorithm and records the encoded base data to a recording media loaded on the recording machine 251. Also, like the recording machine 11, the recording machine 251 is connected to an editing machine 13 with a control line. Further, like the recording machine 11, the recording machine 251 transmits various signals to the editing machine 13 over the control line.

In addition, in response to a control signal transmitted from the editing machine 13 over the control line, the recording machine 251 inserts edit data transmitted from the reproducing machine 12 as an HD-SDI signal into the edit range of the base data recorded to the recording media.

It should be noted that, at this moment, the recording machine 251 executes substantially the same processing that is executed by the recording machine 11, the recording machine 111, and recording machine 211. To be more specific, like the recording machine 11, recording machine 251 computes the bit rate of base data on a GOP basis as a local bit rate. Also, like the recording machine 111, the recording machine 251 sets the upper-limit and lower-limit values of a virtual VBV occupation amount by narrowing the upper-limit and lower-limit values of a VBV occupation amount corresponding to the VBV buffer by an error maximum value. Further, like the recording machine 211, the recording machine 251 computes the VBV occupation amount of a VBV occupation amount target picture from a value obtained by adding 1 to a VBV delay of the VBV occupation amount target picture. Then, on the basis of the local bit rate, the upper-limit and lower-limit values of virtual VBV occupation amount, and the VBV occupation amount of VBV occupation amount target picture, the recording machine 251 variable-length encodes the replacing data that includes edit data.

[Exemplary Detail Configuration of the Recording Machine]

Figure 28:
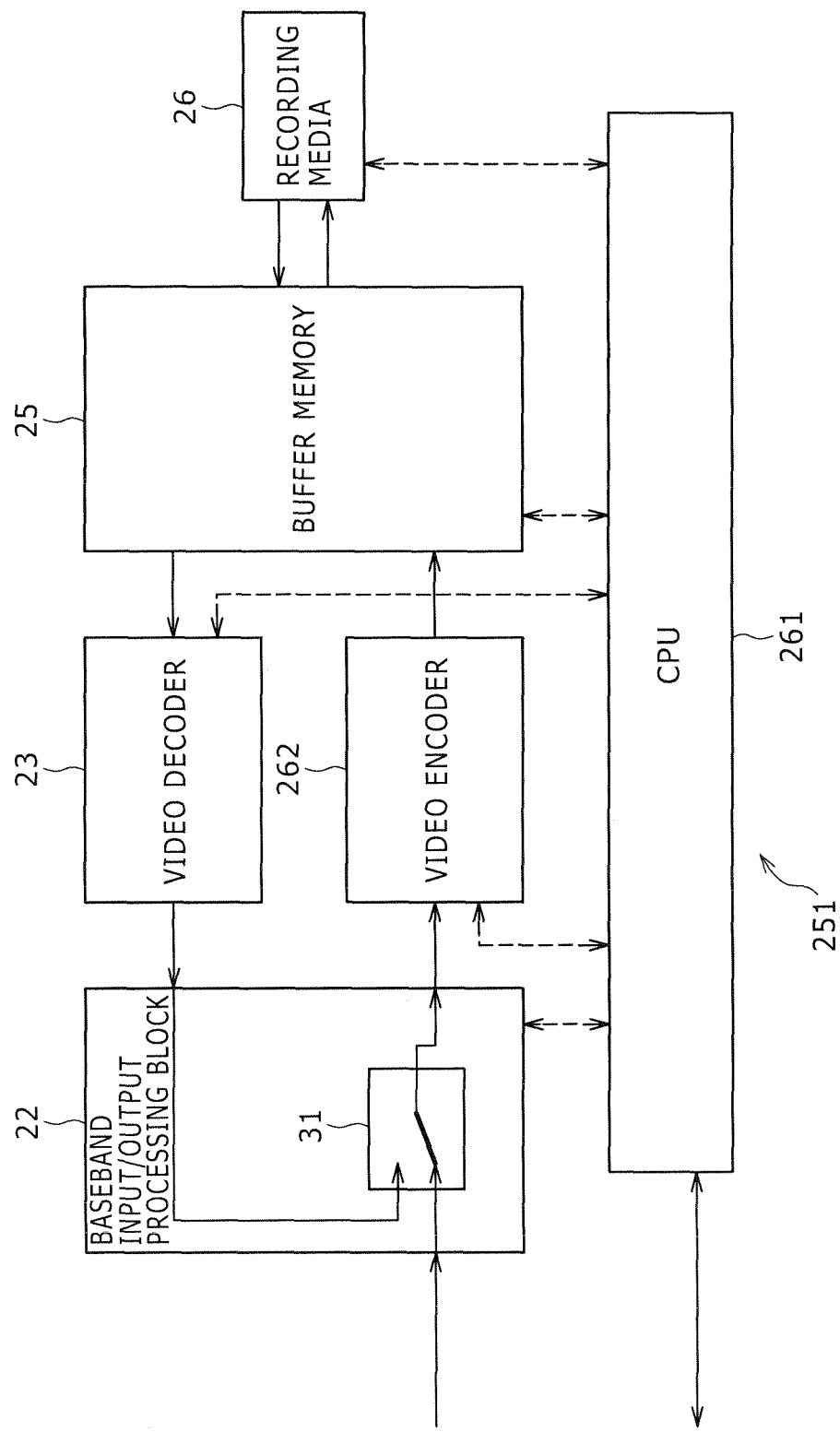
FIG. 28 is a block diagram illustrating an exemplary detail configuration of a recording machine shown in FIG. 27.

Referring to FIG. 28, there is shown a block diagram illustrating an exemplary detail configuration of the recording machine 251 shown in FIG. 27.

Referring to FIG. 28, components similar to those previously described with reference to FIG. 8 are denoted by the same reference numerals and the description thereof is skipped.

The configuration of the recording machine 251 shown in FIG. 28 is mainly different from the configuration shown in FIG. 8 in that a CPU 261 and a video encoder 262 are arranged instead of the CPU 21 and the video encoder 24.

The CPU 261 controls other component blocks on a frame or GOP basis on the basis of controls signals and so on supplied from an editing machine 13.

For example, like the CPU 21 shown in FIG. 8, the CPU 261 (the computation block) computes a local bit rate on a GOP basis by use of a code amount of base data, a VBV delay, and so on, and supplies the computed local bit rate to the video encoder 262. Also, on the basis of the local bit rate, the CPU 261 computes a value obtained by dividing this local bit rate by 90000 for example as a VBV occupation amount error value and supplies this error to the video encoder 262. Further, the CPU 261 computes the VBV occupation amount of a VBV occupation amount target picture from a value obtained by adding 1 to the VBV delay of the VBV occupation amount target picture and supplies the computed VBV occupation amount to the video encoder 262.

Like the CPU 21 shown in FIG. 8, the CPU 261 controls a recording media 26 on the basis of a control signal indicative of a user-specified in-point supplied from the editing machine 13 to start the reading of pictures subsequent to the start picture of the GOP including an in-point supplied from the recording media 26. At the same time, like the CPU 21, the CPU 261 controls the recording media 26 on the basis of control signal indicative of a user-specified out-point supplied from the editing machine 13 to stop the reading of the pictures subsequent to the start picture upon the end of the reading of the terminal picture of the GOP including an out-point supplied from the recording media 26.

Further, like the CPU 21, the CPU 261 monitors the other component blocks. The CPU 261 transmits a signal indicative of information on the recording machine 251, such as a time code, to the editing machine 13.

The video encoder 262 variable-length encodes the base data supplied from the selector 31 in the long-GOP structured MPEG algorithm. Also, on the basis of the local bit rate, the VBV occupation amount error value and the VBV occupation amount of the VBV occupation amount target picture supplied from the CPU 261, the video encoder 262 variable-length encodes the replacing data supplied from the selector 31 in the long-GOP-structured MPEG algorithm. Moreover, like the video encoder 24 shown in FIG. 8, the video encoder 262 supplies the variable-length encoded replacing data or base data to a buffer memory 25 as recording data.

Figure 29:
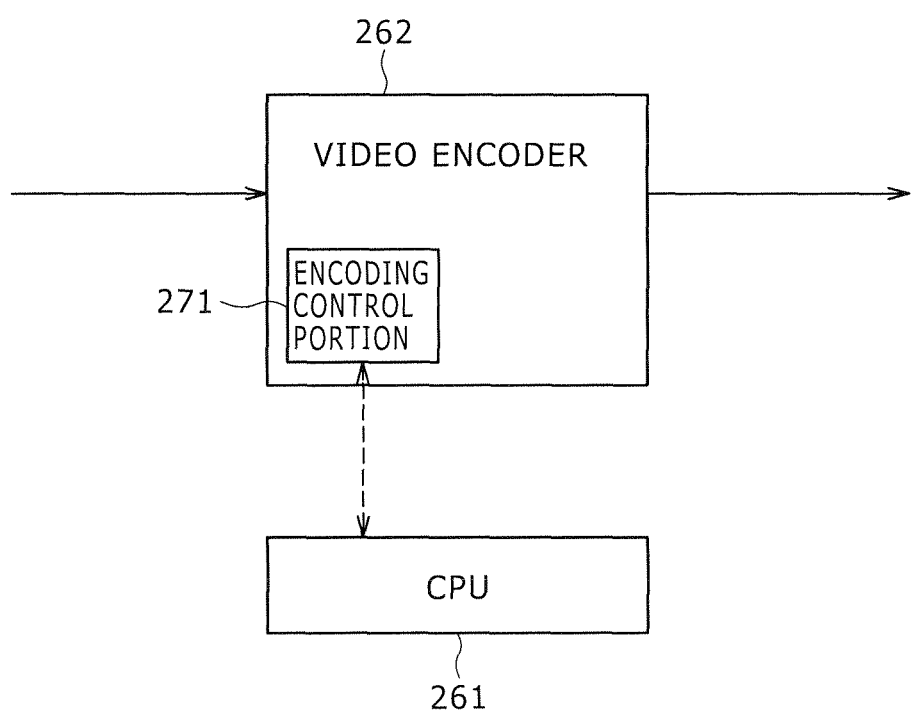
FIG. 29 is a block diagram illustrating details of the processing by a CPU and a video encoder.

Referring to FIG. 29, there is shown a diagram illustrating details of the processing by the CPU 261 and the video encoder 262 in variable-length encoding replace data.

As shown in FIG. 29, like the CPU 21 shown in FIG. 9 for example, the CPU 261 computes a code amount error on the basis of the code amount and VBV occupation amount of variable-length encoded replacing data supplied from a encoding control portion 271 and the code amount and VBV occupation amount of base data. Then, like the CPU 21, the CPU 261 computes a local bit rate on a GOP basis by use of the code amount of base data, a VBV delay, and a code amount error and supplies computed local bit rate to the video encoder 262.

Also, on the basis of the local bit rate, the CPU 261 computes a value obtained by dividing this local bit rate by 90000 for example as a VBV occupation amount error and supplies this error to the video encoder 262. Further, like the CPU 221 shown in FIG. 24, the CPU 261 computes the VBV occupation amount of a VBV occupation amount target picture from a value obtained by adding 1 to the VBV delay of the VBV occupation amount target picture and supplies the computed VBV occupation amount to the video encoder 262.

The video encoder 262 has an encoding control portion 271 for controlling the variable-length encoding of replacing data supplied from the selector 31 (refer to FIG. 28). The encoding control portion 271 executes encoding control in a unit finer than that of the control by the CPU 261 on a frame or GOP basis.

To be more specific, the encoding control portion 271 uses, as a virtual upper-limit value of a VBV occupation amount, a value obtained by subtracting a VBV occupation amount error value from the upper-limit value of an actual VBV occupation amount corresponding to the VBV buffer on the basis of a VBV occupation amount error value supplied from the CPU 261, for example. Also, the encoding control portion 271 uses, as a virtual lower-limit value of a VBV occupation amount, a value obtained by adding a VBV occupation amount error value to the lower-limit value of an actual VBV occupation amount corresponding to the VBV buffer on the basis of a VBV occupation amount error value supplied from the CPU 261, for example.

Then, on the basis of the local bit rate supplied from the CPU 261, the encoding control portion 271 controls the variable-length encoding of the replacing data by the video encoder 262 (the encoding block) such that the VBV occupation amount of the replacing data does not exceed the upper-limit value and does not fall below the lower-limit value, either, of the virtual VBV occupation amount and the VBV occupation amount of the last picture of the replacing data connects to the VBV occupation amount of the VBV occupation amount target picture supplied from the CPU 261. In addition, the encoding control portion 271 acquires the code amount and the VBV occupation amount of the variable-length encoded replacing data and supplies the obtained code amount and VBV occupation amount to the CPU 261.

[Description of the Processing by the Recording Machine]

Figure 30:
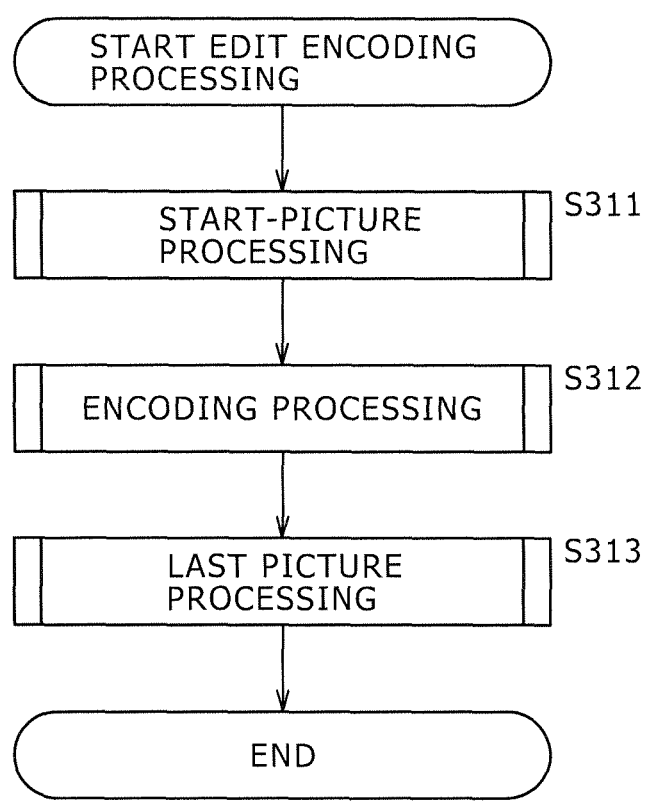
FIG. 30 is a flowchart indicative of editing encoding processing by a recorder shown in FIG. 27.

Referring to FIG. 30, there is shown a flowchart indicative of the edit encoding processing to be executed by the recording machine 251 shown in FIG. 27. This edit encoding processing starts when replacing data is entered in the video encoder 262, for example.

In step S311 shown in FIG. 30, the recording machine 251 executes start-picture processing that is associated with the start-picture of a re-encode range. Details of this start picture processing will be described later with reference to FIG. 31.

In step S312, the recording machine 251 executes encoding processing on replacing data. Details of this encoding processing will be described later with reference to FIG. 32.

In step S313, the recording machine 251 executes last picture processing associated with the last picture of the re-encode range. Details of this last picture processing will be described later with reference to FIG. 33.

Figure 31:
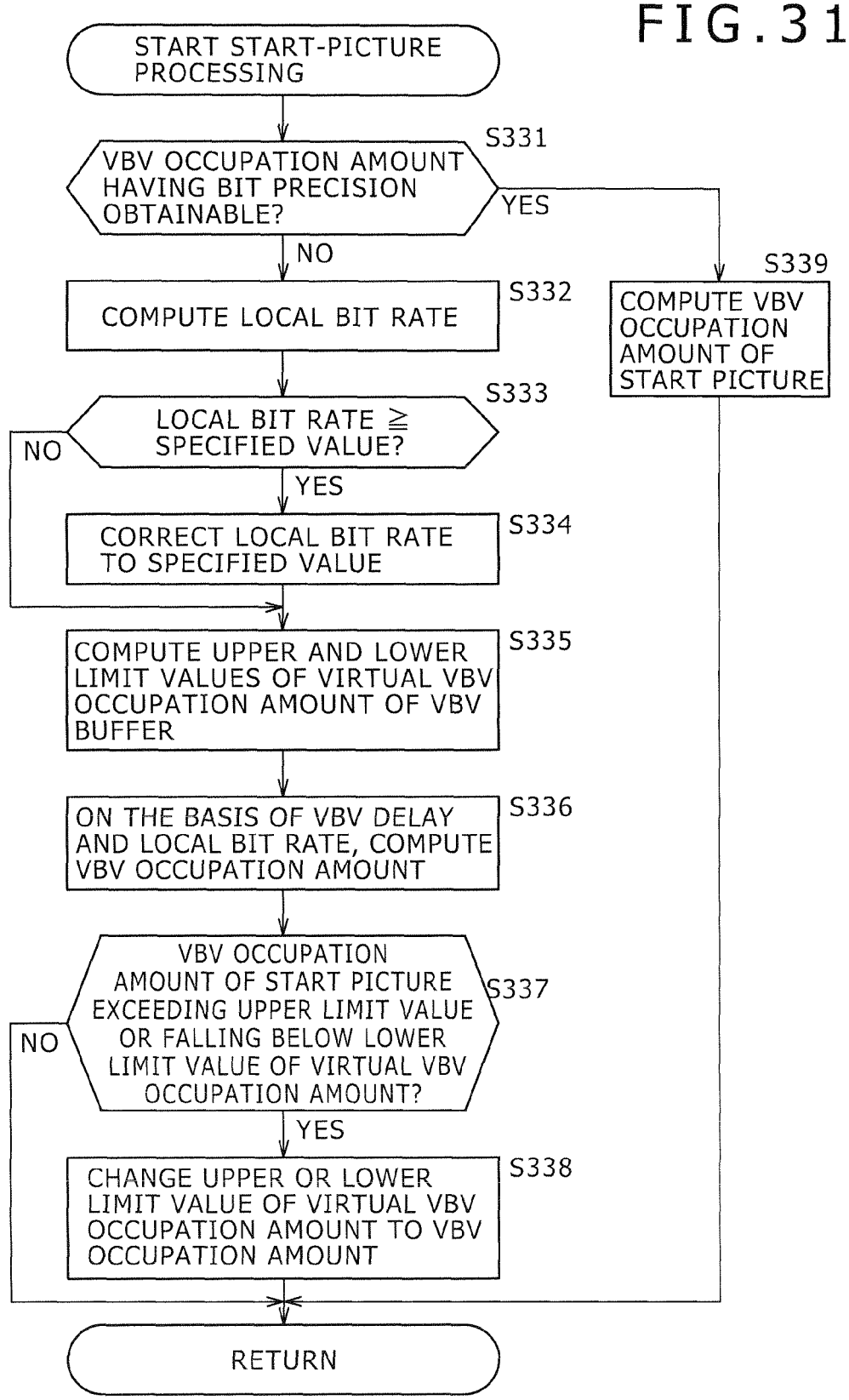
FIG. 31 is a flowchart indicative of details of start picture processing shown in FIG. 30.

Referring to FIG. 31, there is shown a flowchart indicative of the details of the start-picture processing of step S311 shown in FIG. 30.

In step S331 shown in FIG. 31, the CPU 261 (refer to FIG. 28) determines whether a VBV occupation amount having the bit precision of the start picture is obtainable from the variable-length encoded base data. The encoding control portion 271 may make this decision in response to an input externally made or by analyzing the variable-length encoded base data.

If the VBV occupation amount having the bit precision is found to be unobtainable in step S331, then the procedure goes to step S332, In step S332, the CPU 261 computes a local bit rate of a start GOP from equation (3) above by use of the code amount and a VBV delay of the base data of the start GOP of re-encode range.

In step S333, the CPU 261 determines whether the local bit rate computed in step S332 is equal to or higher than a format specified value. If the local bit rate is found to be equal to or higher than the format specified value in step S333, then the CPU 261 corrects the local bit rate to the specified value in step S334 and supplies the corrected local bit rate to the encoding control portion 271. At the same time, the CPU 261 computes a value obtained by dividing the corrected local bit rate by 90000 as a VBV occupation amount error value and supplies the computed error value to the encoding control portion 271. Next, the procedure goes to step S335.

On the other hand, if the local bit rate is found to be not equal to or higher than the format specified value in step S333, then the CPU 261 supplies the local bit rate computed in step S332 to the encoding control portion 271 without change.

Also, the CPU 261 computes a value obtained by dividing the corrected local bit rate by 90000 as a VBV occupation amount error value and supplies the computed error value to the encoding control portion 271. Then, the procedure goes to step S335.

In step S335, the encoding control portion 271 computes the upper-limit and lower-limit values of a virtual VBV occupation amount of the VBV buffer on the basis of the VBV occupation amount error value supplied from the CPU 261 and supplies the computed upper-limit and lower-limit values to the CPU 261.

In step S336, the CPU 261 computes a VBV occupation amount of the start picture on the basis of the VBV delay of the base data of the start picture of the re-encode range and the local bit rate of the start GOP.

In step S337, the CPU 261 determines whether the VBV occupation amount of the start picture of the re-encode range exceeds the upper-limit value or falls below the lower-limit value of the virtual VBV occupation amount supplied from the encoding control portion 271.

If the VBV occupation amount of the start picture of the re-encode range is found to exceed the upper-limit value or fall below the lower-limit value of the virtual VBV occupation amount, then the CPU 261 supplies the VBV occupation amount of the start picture of the re-encode range to the encoding control portion 271.

In step S338, the encoding control portion 271 changes the upper-limit value or the lower-limit value of the virtual VBV occupation amount exceeded or fell below by the VBV occupation amount of the start picture of the re-encode range to the VBV occupation amount of the start picture of the re-encode range.

Thus, if the VBV occupation amount of the start picture of the re-encode range exceeds the upper-limit value or falls below the lower-limit value of the virtual VBV occupation amount, the encoding control portion 271 predicts that the VBV buffer will not underflow or overflow if the VBV occupation amount is within the VBV occupation amount of the start picture. Then, the encoding control portion 271 changes the upper-limit value or the lower-limit value of the virtual VBV occupation amount exceeded by the VBV occupation amount of the start picture of the re-encode range to the VBV occupation amount of the start picture of the re-encode range. As a result, the picture quality deterioration due to the narrowing of the allowable range of VBV occupation amount can be avoided while preventing the VBV buffer underflow or overflow from happening.

After the processing of step S338, the procedure returns to step S311 shown in FIG. 30, from which the procedure goes to step S312.

It should be noted that, if the VBV occupation amount of the start picture of the re-encode range is found to exceed the upper-limit value or fall below the lower-limit value of the virtual VBV occupation amount in step S337, then the encoding control portion 271 may regard that there is a possibility for the VBV buffer to overflow or underflow, thereby ending the edit encoding processing without executing the processing of step S338.

On the other hand, if the VBV occupation amount of the start picture of the re-encode range is found to not exceed the upper-limit value and not fall below the lower-limit value in step S337, then the procedure returns to step S311 shown in FIG. 30, from which the procedure goes to step S312.

If the VBV occupation amount having bit precision is found to be obtainable in step S331, then the CPU 261 computes a VBV occupation amount of the start picture of the re-encode range from equation (2) above on the basis of a VBV delay and so on in step S339. Then, the procedure returns to step S311 shown in FIG. 30, from which the procedure goes to step S312.

Figure 32:
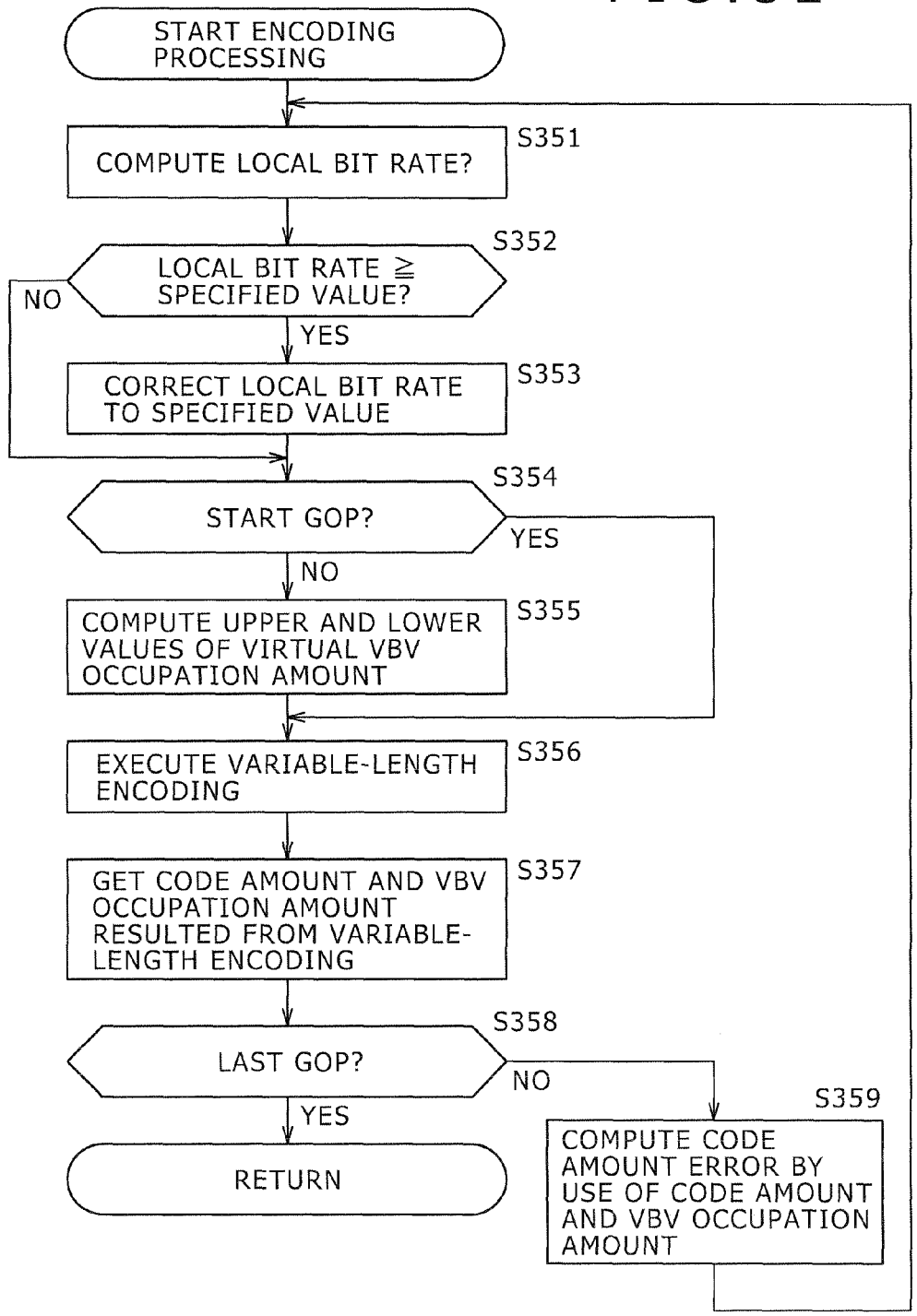
FIG. 32 is a flowchart indicative of details of the encoding processing shown in FIG. 30.

Referring to FIG. 32, there is shown a flowchart indicative of the details of the encoding processing of step S312 shown in FIG. 30. This encoding processing is executed on a GOP basis.

In step S351 shown in FIG. 32, by use of a code amount and a VBV delay of the base data of a GOP subject to processing in the re-encode range, the CPU 261 computes a local bit rate of this GOP. It should be noted that, in the first processing of step S351, the start GOP of the re-encode range is regarded as the GOP subject to processing.

In step S352, as with the processing of step S333 shown in FIG. 31, the CPU 261 determines whether the local bit rate computed in step S351 is equal to or higher than the format specified value or not. If the local bit rate is found to be equal to or higher than the format specified value in step S352, then the CPU 261 corrects the local bit rate to the specified value in step S353 and supplies the corrected local bit rate to the encoding control portion 271. At the same time, the CPU 261 computes a value obtained by dividing the corrected local bit rate by 90000 as a VBV occupation amount error value and supplies this error value to the encoding control portion 271. Then, the procedure goes to step S354.

On the other hand, if the local bit rate is found to be not higher than the format specified value in step S352, then the CPU 261 supplies the local bit rate computed in step S351 to the encoding control portion 271 without change. At the same time, the CPU 261 computes a value obtained by dividing this local bit rate by 90000 as a VBV occupation amount error value and supplies the computed error value to the encoding control portion 271. Then, the procedure goes to step S354.

In step S354, the encoding control portion 271 determines whether the GOP subject to processing is the start GOP of the re-encode range or not. If the GOP subject to processing is found not to be the start GOP of the re-encode range in step S354, then the procedure goes to step S355. In step S355, the encoding control portion 271 computes the upper-limit and lower-limit values of a virtual VBV occupation amount on the basis of the VBV occupation amount error value of the GOP subject to processing supplied from the CPU 261.

As described above, the encoding control portion 271 computes the upper-limit value and lower-limit value of the virtual VBV occupation amount on the basis of a local bit rate, so that the upper-limit value and lower-limit value of the virtual VBV occupation amount can be set more correctly. As a result, the picture quality deterioration owing to the narrowed allowable range of VBV occupation amount can be suppressed while preventing an underflow or an overflow of the VBV buffer from happening. After the processing of step S355, the procedure goes to step S356.

On the other hand, if the GOP subject to processing is found to be the start GOP of the re-encode range in step S354, then the procedure goes to step S356 by skipping step S355.

In step S356, under the control of the encoding control portion 271, the video encoder 262 executes variable-length encoding on replacing data. To be more specific, if the upper-limit and lower-limit values of the virtual VBV occupation amount have been computed, the video encoder 262 executes, on the basis of the local bit rate, variable-length encoding on the replacing data such that the VBV occupation amount does not exceed the upper-limit value and does not fall below the lower-limit value of the virtual VBV occupation amount. On the other hand, if the upper-limit and lower-limit values of the virtual VBV occupation amount have not been computed, then the video encoder 262 executes, on the basis of the local bit rate, variable-length encoding on the replacing data such that the VBV occupation amount does not exceed the upper-limit value and does not fall below the lower-limit value of the actual VBV occupation amount corresponding to the VBV buffer.

In step S357, the encoding control portion 271 gets the code amount and VBV occupation amount of each frame obtained by the execution of variable-length encoding and supplies the obtained code amount and VBV occupation amount to the CPU 261.

In step S358, the video encoder 262 determines whether the GOP subject to processing is the last GOP of the re-encode range. If the GOP subject to processing is found not to be the last GOP of the re-encode range in step S358, then the procedure goes to step S359.

In step S359, the CPU 261 computes a code amount error of each frame from equation (4) above by use of the code amount and VBV occupation amount of each frame supplied from the encoding control portion 271 and the code amount and VBV occupation amount of each frame corresponding to the base data. It should be noted that the VBV occupation amount of the base data of the start picture of the re-encode range is one that was computed by the processing of step S336 or step S339. The VBV occupation amounts of other pictures are computed on the basis of the local bit rate and VBV delay of the GOP including these pictures.

After the processing of step S359, the CPU 261 sets a GOP next to the current GOP subject processing to the GOP to be processed next, upon which the procedure returns to step S351. At this moment, in the processing of step S351, a local bit rate is computed also by use of the code amount error computed by the processing of step S359. Then, the above-mentioned processing of step S351 and on is repeated.

On the other hand, if the GOP subject to processing is found to be the last GOP of the re-encode range in step S358, then the procedure returns to step S312, from which the procedure goes to step S313.

Figure 33:
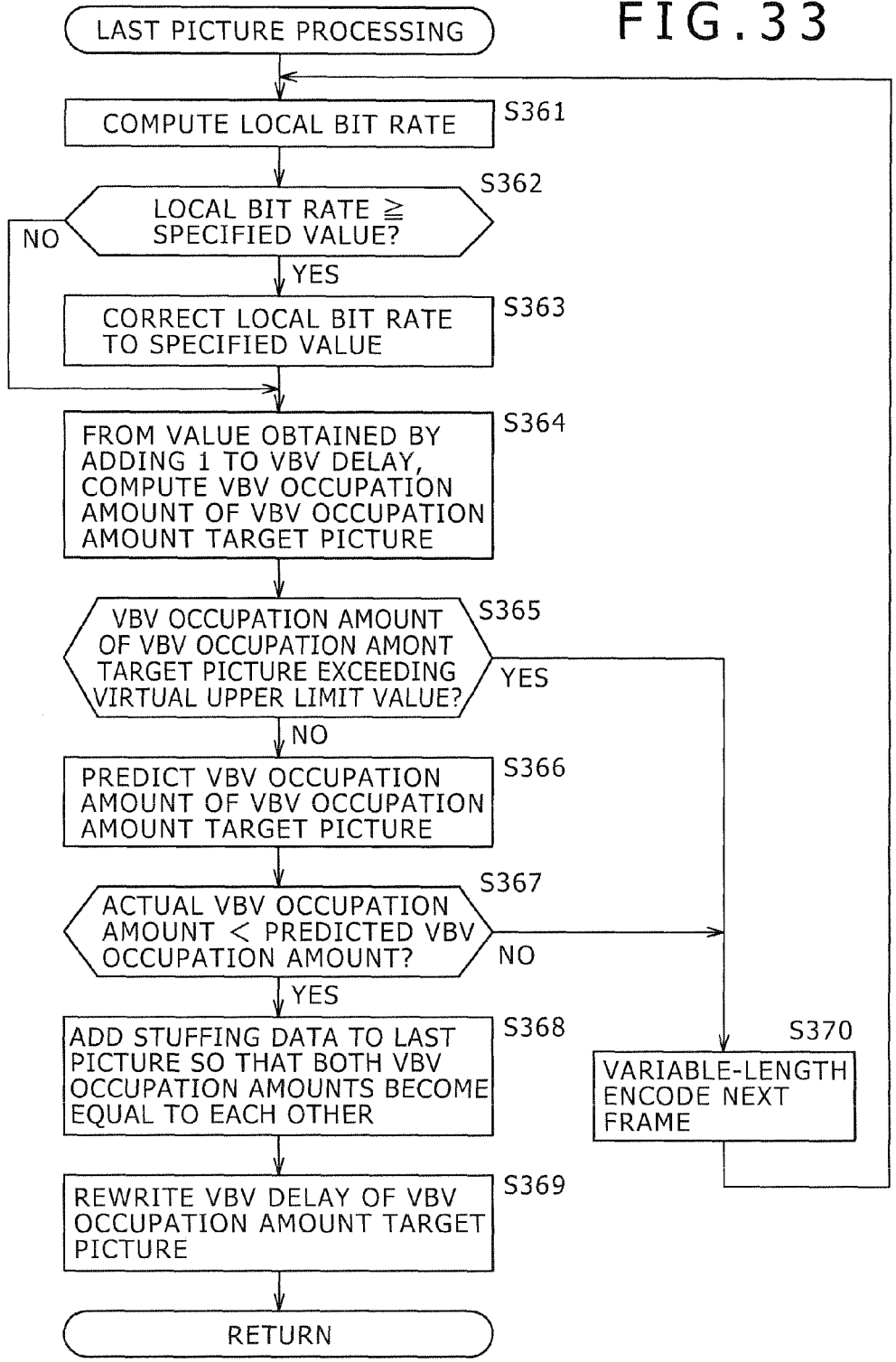
FIG. 33 is a flowchart indicative of details of the last picture processing shown in FIG. 30.

Referring to FIG. 33, there is shown a flowchart indicative of the details of the last picture processing of step S313 shown in FIG. 30.

In step S361 shown in FIG. 33, the CPU 261 computes the local bit rate of the GOP next to the last GOP of the re-encode range by use of the code amount and VBV delay of the base data of this GOP next to the last GOP.

Like the processing of step S333 shown in FIG. 31, the CPU 261 determines in step S362 whether the local bit rate computed in step S361 is equal to or higher than the format specified value or not. If the local bit rate is found to be equal to or higher than the format specified value in step S362, then the CPU 261 corrects the local bit rate to the specified value in step S363 and supplies the corrected local bit rate to the encoding control portion 271. At the same time, the CPU 261 computes a value obtained by dividing the corrected local bit rate by 90000 as a VBV occupation amount error value and supplies the computed error value to the encoding control portion 271. Then, the procedure goes to step S364.

On the other hand, if the local bit rate is found not to be equal to or higher than the format specified value in step S362, then the CPU 261 supplies the local bit rate computed in step S361 to the encoding control portion 271 without change. At the same time, the CPU 261 computes a value obtained by dividing the local bit rate by 90000 as a VBV occupation amount error value and supplies the computed error value to the encoding control portion 271. Then, the procedure goes to step S364.

In step S364, the CPU 261 computes a VBV occupation amount of a VBV occupation amount target picture from the local bit rate of the base data of the GOP next to the last GOP of the re-encode range supplied from the encoding control portion 271 and a value obtained by adding 1 to VBV delay of the VBV occupation amount target picture. Then, the CPU 261 supplies the computed VBV occupation amount to the encoding control portion 271.

In step S365, the encoding control portion 271 determines whether the VBV occupation amount of the VBV occupation amount target picture computed in step S364 exceeds the upper-limit value of the virtual VBV occupation amount of the last GOP of the re-encode range.

If the VBV occupation amount of the VBV occupation amount target picture is found not exceeding the upper-limit value of the virtual VBV occupation amount of the last GOP of the re-encode range in step S365, then the procedure goes to step S366.

In step S366, the encoding control portion 271 predicts the VBV occupation amount of the VBV occupation amount target picture on the basis of the VBV occupation amount and code amount of the replacing data of the last picture of the re-encode range and the local bit rate of the last GOP.

In step S367, the encoding control portion 271 determines whether the VBV occupation amount predicted in step S366 is higher than the computed value of the actual VBV occupation amount computed in step S364.

If the predicted VBV occupation amount is found to be higher than the computed value of the actual VBV occupation amount in step S367, then the encoding control portion 271 adds stuffing data to the replacing data of the last picture of the re-encode range such that both the VBV occupation amounts become equal to each other.

In step S369, the encoding control portion 271 re-computes the VBV delay of the VBV occupation amount target picture by use of the local bit rate used for the variable-length encoding of the re-encode range and rewrites the local bit rate. After the processing of step S369, the procedure returns to step S313 shown in FIG. 30, upon which the above-mentioned processing comes to an end.

On the other hand, if the VBV occupation amount of the VBV occupation amount target value is found to exceed the virtual upper-limit value in step S365 or if the VBV occupation amount predicted in step S367 is found to be equal to or less than the computed value of the actual VBV occupation amount, then the procedure goes to step S370.

In step S370, on the basis of the local bit rate computed in step S361, the encoding control portion 271 variable-length encodes the base data of the frame next to the last frame of the re-encode range such that the upper-limit of the virtual VBV occupation amount value is not exceeded and the lower-limit value of the virtual VBV occupation amount is not fell below. At the same time, the encoding control portion 271 sets this frame next to the last frame to a new last frame of the re-encode range. Then, the procedure returns to step S361 to repeat the above-mentioned processing therefrom.

It should be noted that, if the VBV occupation amount of the VBV occupation amount target picture is found to exceed the virtual upper-limit value or fall below the virtual lower-limit value after the processing of step S364, then, if the VBV occupation amount is within the VBV occupation amount of that VBV occupation amount target picture, it may be predicted that the VBV buffer will not underflow or overflow, thereby executing the processing of step S366 through S370.

As described above, the recording machine 11 (111, 211, or 251) matches the VBV occupation amounts before and after the insert editing by adding stuffing data to the last picture of the re-encode range after the insert editing. Therefore, the recording machine 11 (111, 211, or 251) can start the encoding processing other than the last GOP or the edit encoding processing at the point of time when an in-point is specified by the user without waiting for the specification of an out-point.

Further, in the second and fourth embodiments, the VBV occupation amount of replacing data is prevented from exceeding the virtual upper-limit value and falling below the virtual lower-limit value at the time of variable-length encoding of the replacing data. It is also practicable to prevent the VBV occupation amount of base data from exceeding the virtual upper-limit value and falling below the virtual lower-limit value based on an error maximum value at the time of variable-length encoding of the base data.

In the first, third, and fourth embodiments, replacing data is variable-length encoded such that the code amount of replacing data is matched with the code amount of base data when round-up processing has been executed in quantizing a VBV occupation amount into a VBV delay. Namely, replacing data is variable-length encoded such that the remainder of the division for the VBV occupation amount of replacing data is quantized into a VBV delay becomes zero. Therefore, if the insert editing of the same editing range is executed again, the code amounts before and after the insert editing match each other, not decreasing the code amount due to the insert editing.

The above-mentioned novel technology is also applicable to an editing system configured to execute insert editing in which a predetermined range of a TS (Transport Stream) transmitted from an external device is transmitted after replacing the predetermined range with variable-length encoded replacing data.

The encoding in the present technology is not limited to the long-GOP-structured MPEG algorithm; namely, the encoding in the present technology may be any one of ISO-IEC 13838-2/ITU-TH.262, ISO-IEC 14496-10/ITU-TH.264, ISO-IEC 13818-1/ITU-T H222.0, and other highly efficient encoding schemes, for example.

(5) Fifth Embodiment

Exemplary Hardware Configuration of a Computer

Referring to FIG. 34, there is shown a block diagram illustrating an exemplary hardware configuration of a computer that executes a sequence of processing operations of the above-mentioned recording machine 11 (111, 211, or 251).

In this computer, a CPU (Central Processing Unit) 301, a ROM (Read Only Memory) 302, a RAM (Random Access Memory) 303 are interconnected by a bus 304.

The bus 304 is further connected to an input/output interface 305. The input/output interface 305 is connected to an input block 306, an output block 307, a storage block 308, a communication block 309, and a drive 310.

The input block 306 is made up of a keyboard, a mouse, and a microphone, for example. The output block 307 is made up of a display monitor and a loudspeaker, for example. The storage block 308 is based on a hard disk and nonvolatile memory, for example. The communication block 309 is based on a network interface for example. The drive 310 drives a removable media 311 such as a magnetic disk, an optical disk, a magneto-optical disk, or a semiconductor device.

With the computer configured as described above, the CPU 301 loads a program from the storage block 308 into the RAM 303 via the input/output interface 305 and the bus 304 to execute the program, thereby executing the sequence of processing operations described above.

Programs to be executed by the computer (the CPU 301) can be provided as recorded to the removable media 311 as a package media, for example. In addition, programs can be provided through wired or wireless transmission media, such as a local area network, the Internet, or digital satellite broadcasting, for example.

With the computer, each program can be installed in the storage block 308 through the input/output interface 305 by loading the removable media 311 on the drive 310. In addition, each program can be installed in the storage block 308 by receiving through the communication block 309 via a wired or wireless transmission media. Alternatively, each program can be installed beforehand in the ROM 302 or the storage block 308 to be executed therefrom.

It should be noted that the program to be executed by the computer may execute the processing operations in a time-dependent manner in accordance with a sequence described herein or execute the processing operations in parallel or on an on demand basis.

It should also be noted that term "system" as used herein denotes an entire apparatus made up of two or more components units.

While preferred embodiments of the present invention have been described using specific terms, such description is for illustrative purpose only, and it is to be understood that changes and variations may be made without departing from the spirit or scope of the following claims.

The present application contains subject matter related to that disclosed in Japanese Priority Patent Application JP 2010-054374 filed in the Japan Patent Office on Mar. 11, 2010, the entire content of which is hereby incorporated by reference.

What is claimed is:

1. An information processing apparatus comprising:
a computation block configured to compute a VBV occupation amount of a VBV occupation amount target picture included in plural VBV occupation amount target pictures from a VBV delay of the VBV occupation amount target picture, the VBV occupation amount target picture being variable-length encoded data to be replaced by replacing data, and to set limits of the VBV occupation amount based on a predetermined VBV occupation error, the predetermined VBV occupation error being greater than an actual error calculated based on the VBV delay and representing an error maximum value calculated based on the maximum value of bit rates among the plural VBV occupation amount target pictures; and
an encoding block configured to variable-length encode said replacing data on the basis of said VBV occupation amount of said VBV occupation amount target picture computed by said computation block,
VBV standing for Video Buffering Verifier.

2. The information processing apparatus according to claim 1, wherein
said computation block also computes a bit rate of said base data as a local bit rate in a predetermined unit; and
said encoding block variable-length encodes said replacing data on the basis of said VBV occupation amount of said VBV occupation amount target picture and said local bit rate.

3. The information processing apparatus according to claim 2, wherein
said computation block computes said VBV occupation amount of said VBV occupation amount target picture by use of said local bit rate and said VBV delay of said VBV occupation amount target picture.

4. The information processing apparatus according to claim 2, wherein
said computation block computes said local bit rate such that an error of said local bit rate becomes an error smaller than an actual value.

5. The information processing apparatus according to claim 2, wherein
said computation block computes error between a code amount of said replacing data variable-length encoded by said encoding block and a code amount of said base data and, on the basis of the computed error, computes a bit rate of base data subsequent to said base data as said local bit data in said predetermined unit.

6. The information processing apparatus according to claim 2, wherein,
if said bit rate is not smaller than a predetermined value, then said encoding block corrects said bit rate to said predetermined value and variable-length encodes said replacing data on the basis of the corrected local bit rate and said VBV occupation amount of said VBV occupation amount target picture.

7. The information processing apparatus according to claim 1, further comprising:
a recording block configured to write said replacing data variable-length encoded by said encoding block over a recording area to which said base data is recorded.

8. The information processing apparatus according to claim 1, still further comprising:
a transmission block configured to replace said base data by said replacing data variable-length encoded by said encoding block and transmit the replaced data.

9. The information processing apparatus according to claim 1, wherein
said variable-length encoded data is data with video data highly efficiently encoded.

10. An information processing method comprising the steps of:
computing a VBV occupation amount of a VBV occupation amount target picture included in plural VBV occupation amount target pictures from a VBV delay of the VBV occupation amount target picture, the VBV occupation amount target picture being variable-length encoded data to be replaced by replacing data, and setting limits of the VBV occupation amount based on a predetermined VBV occupation error, the predetermined VBV occupation error being greater than an actual error calculated based on the VBV delay and representing an error maximum value calculated based on the maximum value of bit rates among the plural VBV occupation amount target pictures; and
variable-length encoding, by said information processing apparatus, said replacing data on the basis of said VBV occupation amount of said VBV occupation amount target picture computed in a computation step,
VBV standing for Video Buffering Verifier.

11. A non-transitory computer-readable recording medium storing a program for making a computer execute processing comprising the steps of:
computing a VBV occupation amount of a VBV occupation amount target picture included in plural VBV occupation amount target pictures from a VBV delay of the VBV occupation amount target picture, the VBV occupation amount target picture being variable-length encoded data to be replaced by replacing data, and setting limits of the VBV occupation amount based on a predetermined VBV occupation error, the predetermined VBV occupation error being greater than an actual error calculated based on the VBV delay and representing an error maximum value calculated based on the maximum value of bit rates among the plural VBV occupation amount target pictures; and
variable-length encoding said replacing data on the basis of said VBV occupation amount of said VBV occupation amount target picture computed in a computation step,
VBV standing for Video Buffering Verifier.

12. An information processing apparatus comprising:
computation means for computing a VBV occupation amount of a VBV occupation amount target picture included in plural VBV occupation amount target pictures from a VBV delay of the VBV occupation amount target picture, the VBV occupation amount target picture being variable-length encoded data to be replaced by replacing data, and setting limits of the VBV occupation amounts based on a predetermined VBV occupation error, the predetermined VBV occupation error being greater than an actual error calculated based on the VBV delay and representing an error maximum value calculated based on the maximum value of bit rates among the plural VBV occupation amount target pictures; and
encoding means for variable-length encoding said replacing data on the basis of said VBV occupation amount of said VBV occupation amount target picture computed by said computation means,
VBV standing for Video Buffering Verifier.

* * * * *